(12) United States Patent
Subramanian et al.

(10) Patent No.: US 6,718,320 B1
(45) Date of Patent: *Apr. 6, 2004

(54) SCHEMA MAPPING SYSTEM AND METHOD

(75) Inventors: Narayana Subramanian, San Jose, CA (US); Shivakumar Venkataraman, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/412,033

(22) Filed: Oct. 4, 1999

Related U.S. Application Data
(60) Provisional application No. 60/106,736, filed on Nov. 2, 1998.

(51) Int. Cl.[7] ............................................. G06F 17/30
(52) U.S. Cl. ........................... 707/2; 707/104; 707/102; 707/100; 707/1; 707/4
(58) Field of Search ............................ 707/3, 102, 104, 707/1, 70

(56) References Cited

U.S. PATENT DOCUMENTS

| | | | |
|---|---|---|---|
| 5,276,870 A | | 1/1994 | Shan et al. ............... 395/600 |
| 5,367,675 A | | 11/1994 | Cheng et al. ............. 395/600 |
| 5,548,755 A | | 8/1996 | Leung et al. ............. 395/600 |
| 5,588,150 A | * | 12/1996 | Lin et al. ..................... 707/1 |
| 5,590,321 A | * | 12/1996 | Lin et al. ................... 707/10 |
| 5,671,403 A | | 9/1997 | Shekita et al. ............ 395/603 |
| 5,675,785 A | * | 10/1997 | Hall et al. ................ 707/102 |
| 5,742,806 A | | 4/1998 | Reiner et al. ............. 395/600 |
| 5,768,578 A | | 6/1998 | Kirk et al. ................. 395/611 |
| 5,806,066 A | * | 9/1998 | Golshani et al. .......... 707/100 |
| 5,819,277 A | * | 10/1998 | Golshani et al. .......... 707/100 |
| 6,035,298 A | * | 3/2000 | McKearney ................ 707/10 |
| 6,226,649 B1 | * | 5/2001 | Bodamer et al. ........... 707/10 |
| 6,411,961 B1 | * | 6/2002 | Chen ........................ 707/102 |
| 6,470,354 B1 | * | 10/2002 | Aldridge et al. .......... 707/101 |

FOREIGN PATENT DOCUMENTS

| | | | |
|---|---|---|---|
| WO | WO 98/09238 | 3/1998 | ........... G06F/17/30 |

OTHER PUBLICATIONS

Serge Abiteboul, "Querying Semi–Structured Data", pp. 1–12.

Shivakumar Venkataraman and Tian Zhang, "Heterogeneous Database Optimization in DB2 Universal DataJoiner" 24th VLDB Conference New York, 1998, pp. 1–5.

(List continued on next page.)

*Primary Examiner*—Jean M. Corrielus
(74) *Attorney, Agent, or Firm*—Kunzler & Associates

(57) ABSTRACT

A schema mapping system and method are particularly suitable for expressing a schema mapping between two database schemas that may be heterogeneous (restructuring views of each other). The schema mapping system is useful for generating a least cost query plan expressible on a plurality of heterogeneous tables that are restructuring views of each other. The system may be configured to receive a query against one of the tables and convert it to a plurality of alternate queries, each formatted for the particular schema of a different one of the plurality of heterogeneous tables. In generating the alternate queries, the schema mapping system may utilize SchemaSQL view definitions and may employ restructuring operators expressing and capable of conducting a restructuring of a table into a restructuring view of the table. The system may employ a canonical schema and a virtual canonical table to express a mapping between restructuring views, and may utilize the schema mapping for purposes of query conversion. The alternate queries may be costed and optimized and a query plan returned that has a least cost or service time involved.

30 Claims, 14 Drawing Sheets

OTHER PUBLICATIONS

Tommaso Mostardi and Carlo Siciliano, "An Overview of WIND (Wide Interoperable Networked Databases)" 27th Hawaii International Conference on System Sciences Jan. 4–7, 1994, pp. 216–225.

Weidong Chen, Michael Kifer, and David S. Warren, "HiLog: A Foundation for Higher–Order Logic Programming", pp. 1–42.

Ashish Gupta and Inderpal Singh Mumick "Maintenance of Materialized Views: Problems, Techniques, and Applications", IEEE Data Engineering Bulletin, Special Issue on Materialized Views & Data Warehousing, 18(2), Jun. 1995, pp. 1–16.

Laks V.S. Lakshmanan, Fereidoon Sadri, & Iyer N. Subramanian, "SchemaSQL–A Language for Interoperability in Relational Multi–database Systems", Subbu's Thesis, $22^{nd}$ VLDB Conference, Mubai (Bombay), India, 1996, pp. 1–12.

Surajit Chaudhuri, Ravi Krishnamurthy, Spyros Potamianos, and Kyuseok Shim, "Optimizing Queries with Materialized Views", pp. 190–199.

Alon Y. Levy, Alberto O. Mendelzon, Yehoshua Sagiv, and Divesh Srivastava, "Answering Queries Using Views", pp. 95–104.

Marc Gyssens, Laks V.S. Lakshmanan, Subbu N. Subramanian, "Tables As a Paradigm for Querying and Restructuring", ACM Symposium on Principles of Database Systems, 1996, pp. 1–36.

Renee J. Miller, "Using Schematically Heterogeneous Structures", pp. 1–12.

Laura M. Haas, Donald Kossmann, Edward L. Wimmers, Jun Yang, "Optimizing Queries across Diverse Data Sources", Feb. 21, 1997, pp. 1–25.

Anthony Tomasic, Louiqa Raschid, and Patrick Valduriez, "Scaling Heterogeneous Databases and the Design of Disco", INRIA–Rocquencourt, Nov. 1995, pp. 1–27.

Ravi Krishnamurthy, Witold Litwin, and William Kent, "Language Features for Interoperability of Databases with Schematic Discrepancies", 1991, pp. 40–49.

Ashish Gupta, Inderpal S. Mumick, and Kenneth A. Ross, "Adapting Materialized Views after Redefinitions", SIGMOD 1995, pp. 211–222.

Alin Deutsch, Mary Fernandez, Daniela Florescu, Alon Lavy, Dan Suciu, "A Query Language for XML", pp. 1–19.

Himanshu Gupta, Venky Harinarayan, Anand Rajaraman, and Jeffrey D. Ullman, "Index Selection for Olap", pp. 1–12.

Sudarshan Chawathe, Hector Garcia–Molina, Joachim Hammer, Kelly Ireland, Yannis Papakonstantinou, Jeffrey Ullman, and Jennifer Widom, "The TSIMMIS Project: Integration of Heterogeneous Information Sources", pp. 1–12.

Serge Abieboul and Oliver M. Duschka, "Complexity of Answering Queries Using Materialized Views", pp. 1–10.

V. Christophides, S. Abiteboul S. Cluet and M. Scholl, "From Structured Documents to Novel Query Facilities", INRIA, Feb. 29, 1996, pp. 1–19.

Ashish Gupta, Venky Harinarayan and Dallan Quass, "Aggregate–Query Processing in Data Warehousing Environment", 21st VLBD Conference, Zurich 1995, pp 1–12.

Joachim Hammer, Hector Garcia–Molina, Jennifer Widom, Wilburt Labio, and Yue Zhuge, "The Stanford Data Warehousing Project", $4^{th}$ Int'l Conference on Information and Knowledge Management, Nov. 1995, pp. 1–9.

Jennifer Widom, "Research Problems in Data Warehousing", pp. 1–18.

Frederic Gingras and Laks V.S. Lakshmanan, "nD–SQL: A Multi–dimensional Language for Interoperability and OLAP", 24th VLDB Conference New York, 1998, pp. 1–12.

Laks V.S. Lakshmanan, Fereidoon Sadri, and Iyer N. Subramanian, "Logic and Algebraic Languages for Interoperability in Multidatabase Systems", Journal of Logic Programming, Nov. 1997, pp. 101–149.

Laks V.S. Lakshmanan, Fereidoon Sadri, Iyer N. Subramanian, "On the Logical Foundations of Schema Integration and Evolution in Heterogeneous Database Systems", DOOD'93, Dec. 1993, pp. 1–20.

V.S. Subrahmanian, Sibel Adali, Anne Brink, Ross Emery, James J. Lu, Adil Rajput, Timothy J. Rogers, Robert Ross, and Charles Ward, "HERMES: A Heterogeneous Reasoning and Mediator System", pp. 1–33.

Serge Abiteboul, Oliver M. Duschka, "Complexity of Answering Queries Using Materialized Views", PODS, Seattle 1998, pp. 254–263.

Rafi Ahmed, Philippe De Smedt, Weimin Du, William Kent, Mohammad A. Ketabchi, Witold A. Litwin, Abbas Raffi, and Ming–Chien Shan, "The Pegasus Heterogeneous Multidatabase System", Dec. 1991, pp.19–27.

Jose A. Blakeley, Per–Ake Larson, Frank Wm Tompa, "Efficiently Updating Materialized Views", ACM 1986, pp. 61–71.

David J. DeWitt, Shahram Ghandeharizadeh, Donovan A. Schneider, Allan Bricker, Hui–I Hsiao, and Rick Rasmussen, "The Gamma Database Machine Project", IEE Transactions of Knowledge and Data Engineering, vol. 2, No. 1, Mar. 1990, pp. 44–62.

Ashish Gupta, Inderpal Singh Mumick, V.S. Subrahmanian, "Maintaining Views Incrementally", 1993 ACM SIGMOD International Conference on Management of Data, May 26–28, 1993, pp. 157–166.

Venky Harinarayan, Anand Rajaraman, Jeffrey D. Ullman, "Implementing Data Cubes Efficiently", SIGMOD '96, 1996, pp. 205–213.

Yannis Papakonstantinou, Hector Garcia–Molina, and Jennifer Widom, "Object Exchange Across Heterogeneous Information Sources", 11th International Conference on Data Engineering, Mar. 6–10 1995, pp. 251–260.

Kenneth A. Ross, "Relations with Relation Names as Arguments: Algebra and Calculus", 11th Principles of Database Systems/6/92/San Diego, CA, 1992, pp. 346–353.

Divesh Srivastava, Shaul Dar, H.V. Jagadish, and Alon Y. Levy, "Answering Queries with Aggregation Using Views", Proceedings of the 22nd VLDB Conference Bombay, India, 1996, pp. 1–12.

Michael Stonebraker, Anant Jhingran, Jeffrey Goh, and Spyros Potamianos, "On Rules, Procedures, Caching And Views In Data Base Systems", ACM 1990, pp. 281–290.

* cited by examiner risk-analysis department — 172 ibm — 186

| date | xaction | ag007 | ag008 | ag009 |
|---|---|---|---|---|
| 10/01 | buy | 10000 | 25000 | 35000 |
| 10/01 | sell | 50000 | 30000 | 8000 |
| 10/02 | buy | 30000 | 22000 | 4000 | msft — 176

| date | xaction | ag007 | ag008 | ag009 |
|---|---|---|---|---|
| 10/01 | buy | 10000 | 20000 | 30000 |
| 10/01 | sell | 20000 | 25000 | 10000 |
| 10/02 | buy | 10000 | 22000 | 10000 |

Fig. 3a research department — 180 ibm — 182

| date | xaction | agent | value |
|---|---|---|---|
| 10/01 | buy | ag007 | 10000 |
| 10/01 | sell | ag007 | 50000 |
| 10/02 | buy | ag008 | 22000 | msft — 184

| date | xaction | agent | value |
|---|---|---|---|
| 10/01 | buy | ag007 | 10000 |
| 10/01 | sell | ag007 | 25000 |
| 10/02 | buy | ag008 | 10000 |

Fig. 3b traders department — 186 ag007 — 188

| date | stock | xaction | value |
|---|---|---|---|
| 10/01 | ibm | buy | 10000 |
| 10/01 | msft | sell | 20000 |
| 10/02 | msft | buy | 10000 | ag008 — 190

| date | stock | xaction | value |
|---|---|---|---|
| 10/01 | ibm | buy | 25000 |
| 10/01 | msft | sell | 25000 |
| 10/02 | msft | buy | 22000 |

Fig. 3c profit-loss department — 192 buysell — 194

| date | stock | agent | buy | sell |
|---|---|---|---|---|
| 10/01 | ibm | ag007 | 20000 | 30000 |
| 10/01 | msft | ag008 | 25000 | 10000 |
| 10/02 | HWP | ag008 | 22000 | 10000 |

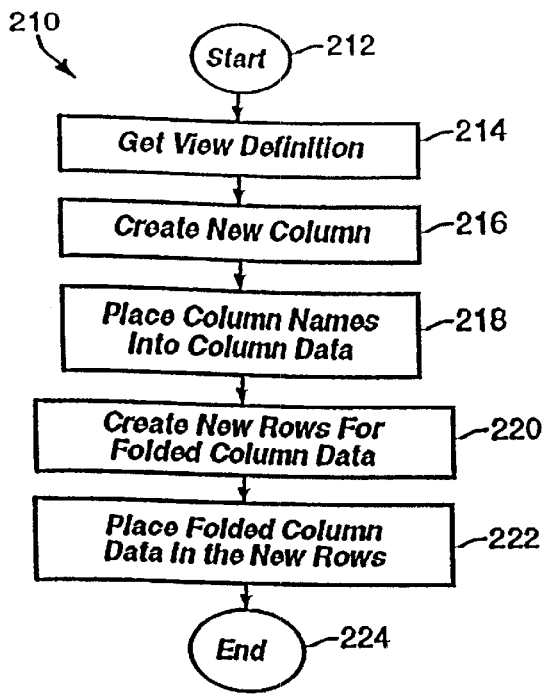
Fig. 4a  Fold Operation
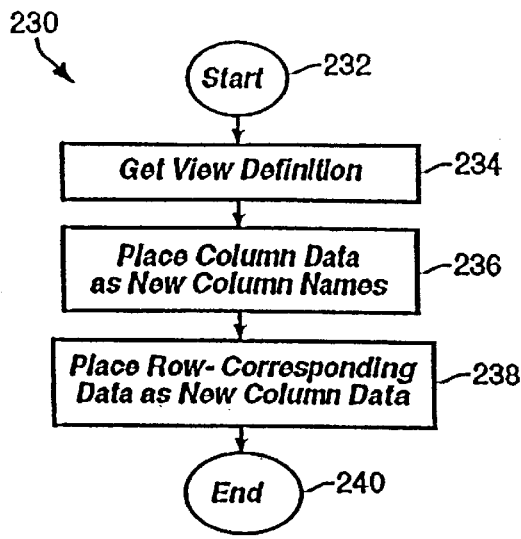
Fig. 4b  Unfold Operation
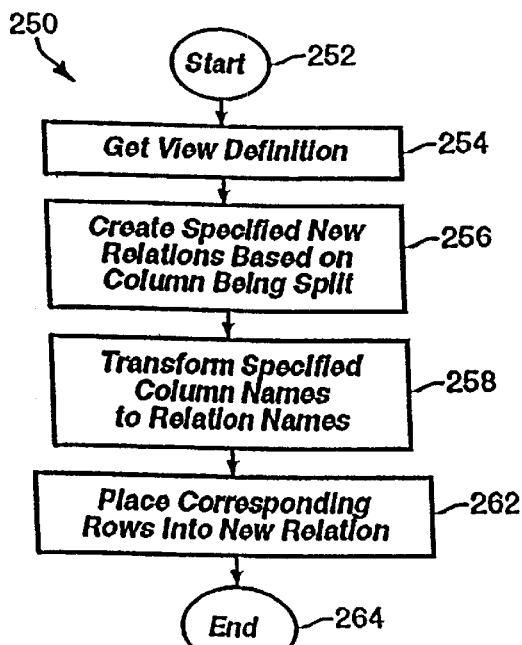
Fig. 4c  Split Operation
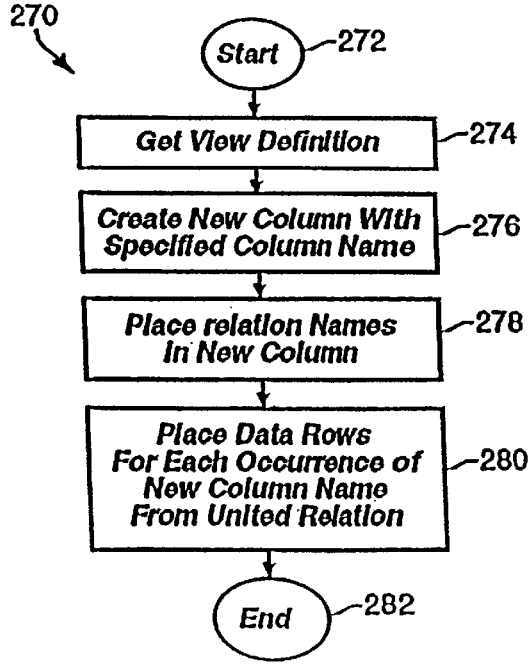
Fig. 4d  Unite Operation
Fig. 4 db: :stock_trades

| date | stock | agent | xaction | value |
|------|-------|-------|---------|-------|
| 10/01 | ibm | ag007 | buy | 10000 |
| 10/01 | msft | ag007 | sell | 20000 |
| 10/02 | ibm | ag008 | buy | 22000 |
| 10/02 | ibm | ag009 | buy | 4000 |

Fig. 9a  stock_trades relation

| agent_trades | | | | | |
|---|---|---|---|---|---|
| date | agent | xaction | stock | value | commission |
| 10/01 | ag007 | buy | ibm | 10000 | 100 |
| 10/01 | ag007 | sell | ibm | 50000 | 500 |
| 10/01 | ag008 | buy | ibm | 25000 | 250 |
| 10/01 | ag008 | sell | ibm | 30000 | 300 |

Fig. 9b  agent_trades relation

*Fig. 9*

Fig. 11a Canonical Map Table

| ID | Delete Query | Canonical Query |
|----|---|---|
| 1 | A, agent = 'ag007', stock= 'ibm' | stock_trades, agent='ag007', stock='ibm' |
| 2 | B, agent = 'ag008', stock= 'ibm', xaction='sell' | stock_trades, agent='ag008', stock='ibm', xaction='sell' |
| 3 | A,B, xaction=xaction, date=date, stock=stock, stock='ibm' xaction='sell', value > value | stock_trades, stock_trades, xaction=xaction date=date, stock=stock, stock='ibm' xaction='sell', value > value |

Fig. 11b Restructuring-Views Map Table

| ID | Query on restructuring-View |
|----|---|
| 1 | profit.buysell(date, stock, 'sell', sell), stock='Ibm', agent='ag007' |
| 1 | traders.ag007(date, stock, xaction, value), stock='Ibm', xaction='sell' |
| 1 | research.ibm(date, 'Ibm', xaction, value), agent='ag007', xaction='sell' |
| 1 | risk.ibm(date, 'ibm', xaction, ag007), xaction='sell' |
| 2 | profit.buysell(date, stock, 'buy', buy), stock='Ibm', agent='ag008' U profit.buysell(date, stock, 'sell', sell), stock='Ibm', agent='ag008' |
| 1 | profit.ag008(date, stock, xaction, value), stock='Ibm' |
| 1 | research.ibm(date, 'Ibm', xaction, value), agent='ag008' |
| 1 | risk.ibm(date, 'ibm', xaction, ag008) |
| 1 | risk.ibm(date, 'ibm', xaction, ag008), xaction='sell', ag007 > ag008 |

Fig. 11

SCHEMA MAPPING SYSTEM AND METHOD

RELATED APPLICATIONS

This application is a Continuation-in-part of my co-pending provisional patent application entitled Query Optimization Using Restructuring Views, Ser. No. 60/106,736, which was filed on Nov. 2, 1998.

BACKGROUND OF THE INVENTION

1. The Field of the Invention

The present invention relates to querying databases. More specifically, the present invention relates to manners of optimizing queries in single or multiple database systems in which partially or fully replicated data exist.

2. The Relevent Technology

Two scenarios frequently occur in modem database usage. In both scenarios, multiple tables or "relations" within a single database or within different databases may exist and be available to an entity or organization. The tables in these particular instances contain partially or fully replicated information. That is, the information or "data" in the different tables may be equivalent. Additionally, the tables exhibit heterogeneous formatting, or "schemas." That is, the information within the tables may be organized into different combinations of relations, rows, and columns, possibly with different relation names, row names, and columns. Such tables are referred to herein as being "restructuring views" of each other.

In a first scenario, the tables are naturally occurring. That is, the different tables exist for independent purposes. For instance, separate departments of an organization may individually maintain their own databases or tables within a common database, but may populate the tables or database with information from a common source. Such tables may be available to over a local network. Additionally, different databases that exhibit replicated information and heterogeneous schemas may exist at remote locations within organizations or may be maintained by different organizations and be commonly available over large scale networks such as the Internet.

In a second scenario, the tables are replicated for research purposes. A first table or "base table" is generally a naturally occurring database. The other tables are generally replicated from the first table as subsets of the first table. The replications often take the form of views. A View is a mechanism employed by the SQL language of which most databases are constructed that acts as a filter, showing only a portion of the data in the table to the user. Views, as abbreviated forms of the tables, can be searched more quickly than the full table or set of tables. A view can be created every time it is referenced, or it can be "materialized" and exist in a permanent or semi-permanent form.

Generally, when databases are replicated, as in our second scenario, they maintained through the use of materialized views. One such multiple database system (MDBS) in which materialized views are used for research and complex querying is known as a data warehouse. Various tools for managing such data warehouses exist, one example of which is IBM's DataJoiner® product.

It is a primary objective in designing database systems to expedite query servicing by optimizing the query system. The use of materialized views is one manner in which the art has approached query optimization. It is often the case that certain materialized views can be more efficiently accessed for certain types of queries while others are more efficient for other types of queries. Thus, one technique for speeding up query servicing is to maintain a plurality of materialized views and to selectively direct queries to the appropriate materialized view for which the query can be most rapidly serviced.

A further development in the art of MDBS management is the addition of certain management tools to the SQL language. One such tool is SchemaSQL. SchemaSQL is a proposed extension to the SQL language that promotes efficient manipulation and classification of materialized views. For instance, SchemaSQL provides "view definitions," which allow one materialized view to be mapped to another.

Conventional management and querying of views presumes that the views exhibit a common schema. Nevertheless, as discussed above, many naturally occurring multiple database systems include databases having heterogeneous schemas. It would be advantageous to employ the replicated tables in query optimization. Additionally, it has been predicted by the inventors that tables with replicated data and heterogeneous schemas could be used to further improve query optimization in data warehousing applications.

Accordingly, a need exists for a query optimization system that is compatible with and which capitalizes on the presence of databases that are restructuring views of each other. Such a query optimization system, to be most advantageous, should be easily implemented with existing technology and noninvasive to the MDBS on which it is intended to operate. Such a query optimization system and its method of use are disclosed herein.

OBJECTS AND BRIEF SUMMARY OF THE INVENTION

The apparatus of the present invention has been developed in response to the present state of the art, and in particular, in response to the problems and needs in the art that have not yet been fully solved by currently available database management systems. Thus, it is an overall objective of the present invention to provide a query optimization system and method for a database management system that capitalizes on the presence of multiple tables that are restructuring views of each other.

To achieve the foregoing object, and in accordance with the invention as embodied and broadly described herein in the preferred embodiment, a query optimization system and method are provided. The query optimization system preferably is implemented with modules for execution by a processor. In one embodiment, the modules comprise a schema mapping module executable on the processor to express a schema mapping between a plurality of database tables with heterogeneous schemas and at least partially replicated information. The modules preferably also include a middleware module adapted to employ a middleware schema for use as a reference in expressing the schema mapping.

The query optimization system is preferably compatible with existing technology that optimizes queries by posing them against materialized views. Additionally, the query optimization system of the present invention may be adapted for use on a multiple database system (MDBS) comprising databases that are restructuring views of each other. That is, the databases preferably contain data that is partially or fully replicated among the databases, but exhibit heterogeneous schemas.

In one embodiment, the middleware module comprises a canonical schema module that constructs a virtual canonical schema. The virtual canonical schema is used to express a schema mapping between different restructuring views. The schema mapping may, in one embodiment, comprise an SQL view definition.

A plurality of operators may also be employed by the schema mapping module in expressing the schema mapping. In one embodiment, each operator represents a particular type of manipulation for transforming base tables into restructuring views and for expressing the transformations. Preferably, the plurality of operators are adapted for noninvasive use with existing databases. For instance, it is preferable that the operators perform operations written in the SchemaSQL language or a similar SQL compatible language or syntax.

In one embodiment, the operators comprise a fold operator, an unfold operator, a split operator, and a unite operator.

The query optimization system may also comprise a schema restructuring module executable on a processor to restructure a database relation into a restructuring view of the database relation in conjunction with the schema mapping module and the middleware module.

A query processing module may also be included and may serve as a query translation module. The query processing module is preferably executable on the processor to communicate with the schema mapping module and translate a received query executable on one of the plurality of heterogeneous database tables to a substantially equivalent query executable on another of the plurality of heterogeneous database tables. In one embodiment, the query processing module comprises a restructuring view to canonical query conversion module (or merely canonical query processing module) executable on the processor to translate the received query into a canonical schema query adapted as a query on a canonical table.

The query processing module preferably comprises a canonical query to restructuring view conversion module (or merely restructuring view translation module) executable on the processor to translate a canonical schema query into a query on one or more of the restructuring views.

The query processing module may also comprise a canonical map table generation module executable on a processor to generate a canonical map table. In one embodiment, the canonical map table comprises a portion of the schema mapping and is used in the query conversion operations as well as by a query optimization module. Under the present invention, a second map table, a restructuring views map table, is preferably employed, and accordingly, the query processing module may comprise a restructuring view map table generation module executable on the processor to generate the restructuring view map table.

The query optimization system may also comprise a query optimization module executable on a processor to receive a plurality of substantially equivalent queries generated by the query processing module together with the canonical map table and the restructuring views map table. In response, the query optimization module preferably consults and utilizes the plurality of substantially equivalent queries to generate an optimized query plan, executable at a least cost on one or more of the base table and restructuring views.

In one embodiment, the query processing module is adapted to provide the query optimization module with at least two of a base table query, a materialized view query, and a restructuring view query. Under this embodiment, the query optimization module is adapted to consider each of these queries in generating an optimized query plan executable on the plurality of heterogeneous database tables at a least cost.

An attendant method of use of the query optimization system is one embodiment comprises expressing a schema mapping between a plurality of databases containing at least partially replicated information and referencing a middleware schema in exressing the schema mapping. As described above, the middleware schema preferably comprises a virtual middleware table. In one embodiment, the virtual middleware table comprises a canonical table.

As also described above, the plurality of database tables may comprise restructuring views of each other, and as such, may be heterogeneous database tables exhibiting partially or fully replicated data.

In expressing the schema mapping, the plurality of operators may be employed, each operator representing a particular type of transformation between heterogeneous schemas. It is preferred that the plurality of operators are adapted for noninvasive use with existing databases. As described, the plurality of operators preferably includes a fold operator, an unfold operator, a split operator, and a unite operator. The operators may be employed within an SQL view definition expressing the schema mapping. The schema mapping and the operators may be employed in restructuring a database relation into a restructuring view of the database relation.

The method of the present invention may further involve automatically translating a query executable on one of the plurality of databases to equivalent queries on others of the plurality of databases and automatically selecting from among the equivalent queries a query corresponding to a selected criterion.

Other optional steps may comprise translating a received query executable on one of the plurality of heterogeneous database tables to a substantially equivalent query executable on another of the plurality of heterogeneous database tables using the schema mapping. In so doing, the received query may also be translated into a query on a base table. In additional steps, the query on the base table may be converted to a query on the canonical schema and the canonical schema query may be translated into a query on one or more of the heterogeneous database tables.

The method may also comprise receiving a plurality of substantially equivalent queries generated by the query processing module and in response generating an optimized query plan executable on the plurality of heterogeneous database tables at a least cost. In conducting the conversions, a canonical map table may be generated and may be accompanied by a restructuring view map table.

Once the plurality of alternate queries are generated, the method may involve generating with the use of the substantially equivalent queries an optimized query plan executable on the plurality of heterogeneous database tables at a least cost. In so doing, queries on a base table, on a materialized view, and on a restructuring view may be considered in the generation of the optimized query plan.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 is a representation of four databases or components thereof which are restructuring views of each other.

FIG. 4 is a collective depiction of four schematic flow charts illustrating one manner of operation of a fold operation, an unfold operation, a split operation, and a unite operation.

FIG. 9 is a representation of two databases or components thereof, including (i) a stock_trade database, and (ii) an agent_trades database.

FIG. 11 is a representation of two map tables for use with the query optimization system of FIG. 2, including (i) a canonical map table; and (ii) a restructuring views map table.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 12, is not intended to limit the scope of the invention, as claimed, but is merely representative of presently preferred embodiments of the invention.

FIGS. 1 through 12 are schematic block diagrams and flow chart diagrams which illustrate in more detail the preferred embodiments of the present invention. The schematic block diagrams illustrate certain embodiments of modules for performing various functions of the present invention. In general, the represented modules include therein executable and operational data for operation within a computer system of FIG. 1 in accordance with the present invention.

As used herein, the term executable data, or merely an "executable," is intended to include any type of computer instructions and computer executable code that may be located within a memory device and/or transmitted as electronic signals over a system bus or network. An identified module of executable code may, for instance, be organized as an object, procedure, or function. Nevertheless, the executables of an identified module need not be located together, but may comprise disparate instructions stored in different locations which together comprise the module and achieve the purpose stated for the module. Indeed, an executable could be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
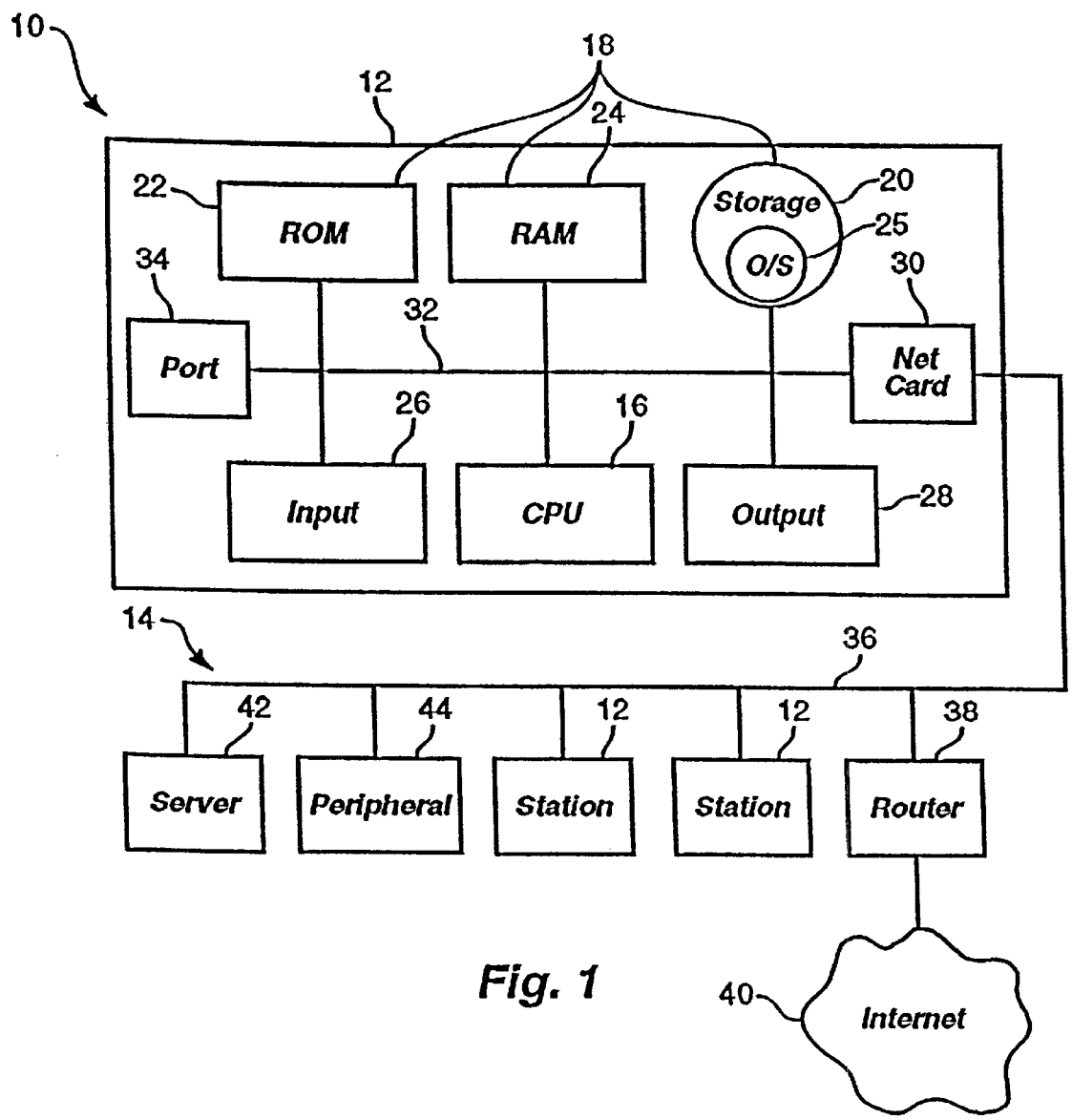
FIG. 1 is a schematic block diagram illustrating one embodiment of a computer system for use with the present invention.

FIG. 1 is a schematic block diagram which illustrates a computer system 10 in which executable and operational data, operating in accordance with the present invention, may be hosted on one or more computer stations 12 in a network 14. The network 14 may comprise a wide area network (WAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD ROM drive, a read-only memory (ROM) 22, and a random access volatile memory (RAM) 24.

The computer station 12 or system 10 in general may also include one or more input devices 26 for receiving inputs form a user or form another device. Similarly, one or more output devices 28 may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28 the network card 30, and one or more additional ports 34. The system bus 32 and a network backbone 36 may be thought of as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local network (LAN), a wide area network (WAN), several adjoining networks, an intranet, or as in the manner depicted, a system of interconnected networks such as the Internet 40. The individual stations 12 communicate with each other over the backbone 36 and/or over the Internet 40 with varying degrees and types of communications capabilities and logic capability. The individual stations 12 may include a mainframe computer on which the modules of the present invention may be hosted.

Different communication protocols, e.g., ISO/OSI, IPX, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

Figure 2:
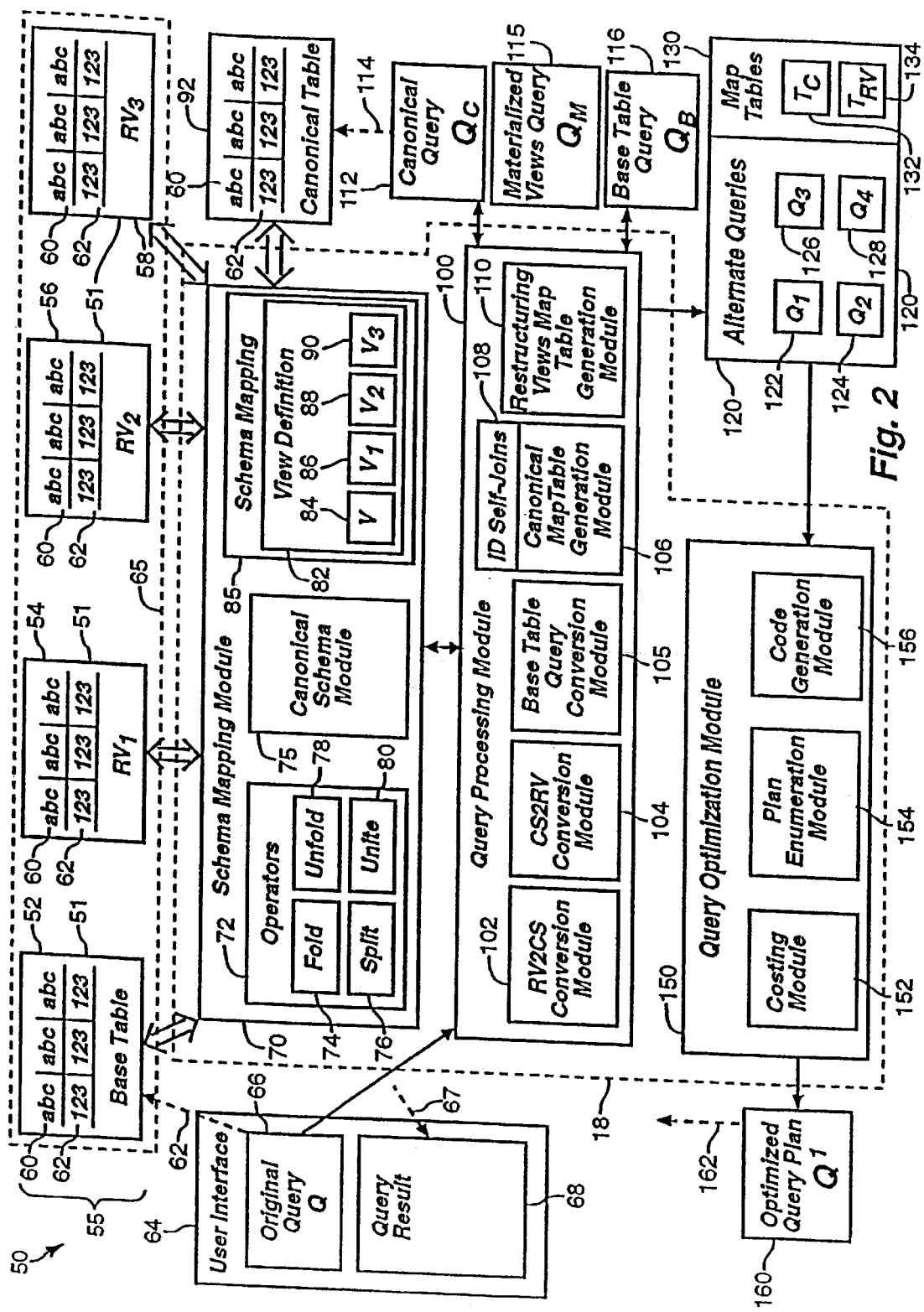
FIG. 2 is a schematic block diagram illustrating one embodiment of a query optimization system of the present invention.

Referring now to FIG. 2, the query optimization system 50 of the present invention, in one embodiment, includes a plurality of modules containing executable code and operational data suitable for execution by the CPU 16 and operation within the memory devices 18 of FIG. 1. Of course, the memory devices 18 in which the modules of the present invention are located may also be distributed across both local and remote computer stations 12.

The query optimization system 50 is shown in FIG. 2 operating in conjunction with a multiple database system (MDBS) 55. As depicted, the MDBS 55 comprises a plurality of databases 51. The databases 51 include a base table database 52, a database 54 which is a first restructuring view of the base table database 52, a database 56 which is a second restructuring view of the base table database 52, and a database 58 which is a third restructuring view of the base table database 52. Each database 51 is represented schematically as including data 62 organized in a schema 60. An example of the databases 51 is shown in FIG. 3 and discussed below in greater detail.

In accordance with the definition of "restructuring view" as used herein, the data 62 of each of the restructuring view databases 54, 56, 58 is partially or fully equivalent to the data 62 of the base table database 52. Also in accordance with the definition of the term "restructuring view", the schemas 60 exhibited by the depicted databases 51 are heterogeneous. That is, data within a column of one database 51 may comprise metadata such as column names and/or relation names within another database 51, and vice versa.

Also shown in the query optimization system 50 of FIG. 2 is a user interface 64. The user interface 64 may comprise a graphical user interface or any other construct for allowing a user to interact with and query a MDBS 55. With in the user interface 64 are shown an original query 66 and a query result 68. As stated, a main object of the query optimization system 50 is to receive the original query 66 and return an optimized query plan 160 that is employable against the MDBS 55 to return the desired query result 68 with the lowest cost or servicing time.

Also included in the query optimization system 50 may be a schema mapping module 70. In the depicted embodiment, the schema mapping module 70 is shown provided with a memory device 18. Also provided within a memory device 18 are a query processing module 100 and a query optimization module 150. In one embodiment, the memory device 18 is a CD ROM upon which the modules 70, 100, 150 are distributed. As discussed above, the modules of-the present invention may be provided on any suitable memory device 18 and may be stored or shipped on separate memory devices 18.

The schema mapping module 70 is shown provided with a plurality of operators 72, a canonical schema module 75, and a plurality of view definitions 82. In one embodiment of the present invention, the schema mapping module 70 is used to express a schema mapping 85 of the databases 51. The schema mapping 85 may be in the form of view definitions 82 which, in one embodiment, comprise view definitions under the proposed addition to the SQL language entitled SchemaSQL, which is discussed below.

The schema mapping 85 may be used in order to generate the restructuring views 54, 56, 58 by restructuring the base table 52. The schema mapping 85 may also be achieved with the use of the operators 72 which represent and implement the various operations involved in restructuring a base table to a restructuring view and vice versa. In one embodiment, the view definitions 82 employ the operators 72 to express the schema mapping 85 of the databases 51. One example of the employment of the operators 72 is shown in FIG. 4 and discussed below in greater detail.

In one embodiment, the schema mapping 85 achieved by the schema mapping module 70 employs a middleware system. The middleware system preferably comprises a middleware schema that functions as a central point in the conversions between a base table and a restructuring view. In the depicted embodiment, the middleware schema comprises a canonical schema. The canonical schema is preferably implemented with a middleware module, such as a canonical schema module 75. In the implementation of the canonical schema, a virtual canonical table 92 may be referenced.

The canonical table 92 is devised of data 62 which is partially or fully equivalent to the data 62 of the databases 51 of the MDBS 55. Additionally, the canonical table 92 has a schema 62 which is either equivalent to or a restructuring view of each database 51 of the MDBS. Preferably, the canonical schema module 75 devises and references the canonical table 92, but does not materialize the canonical table 92. The canonical table 92 and the canonical schema in general are discussed below in greater detail.

The query processing module 100 is configured to receive the original query 66, which may be a query on the base table 52, the restructuring views 54, 56, 58 or the virtual canonical table 92. In response, the query processing module 100 generates a plurality of alternate queries 120. Each of the alternate queries 120 is equivalent to the original query 66, and is formatted for the particular schema 60 of one of the databases 51 of the MDBS 55.

The query processing module 100 may be configured in any suitable manner, and may take advantage of the existing technology employed in the optimization of queries using views and materialized views. In the depicted embodiment, the query processing module 100 includes a restructuring views to canonical schema (RV2CS) conversion module 102, a canonical schema to restructuring views (CS2RV) conversion module 104, a base table query conversion module 105, a canonical map table generation module 106, and a restructuring views map table generation module 110.

Figure 7:
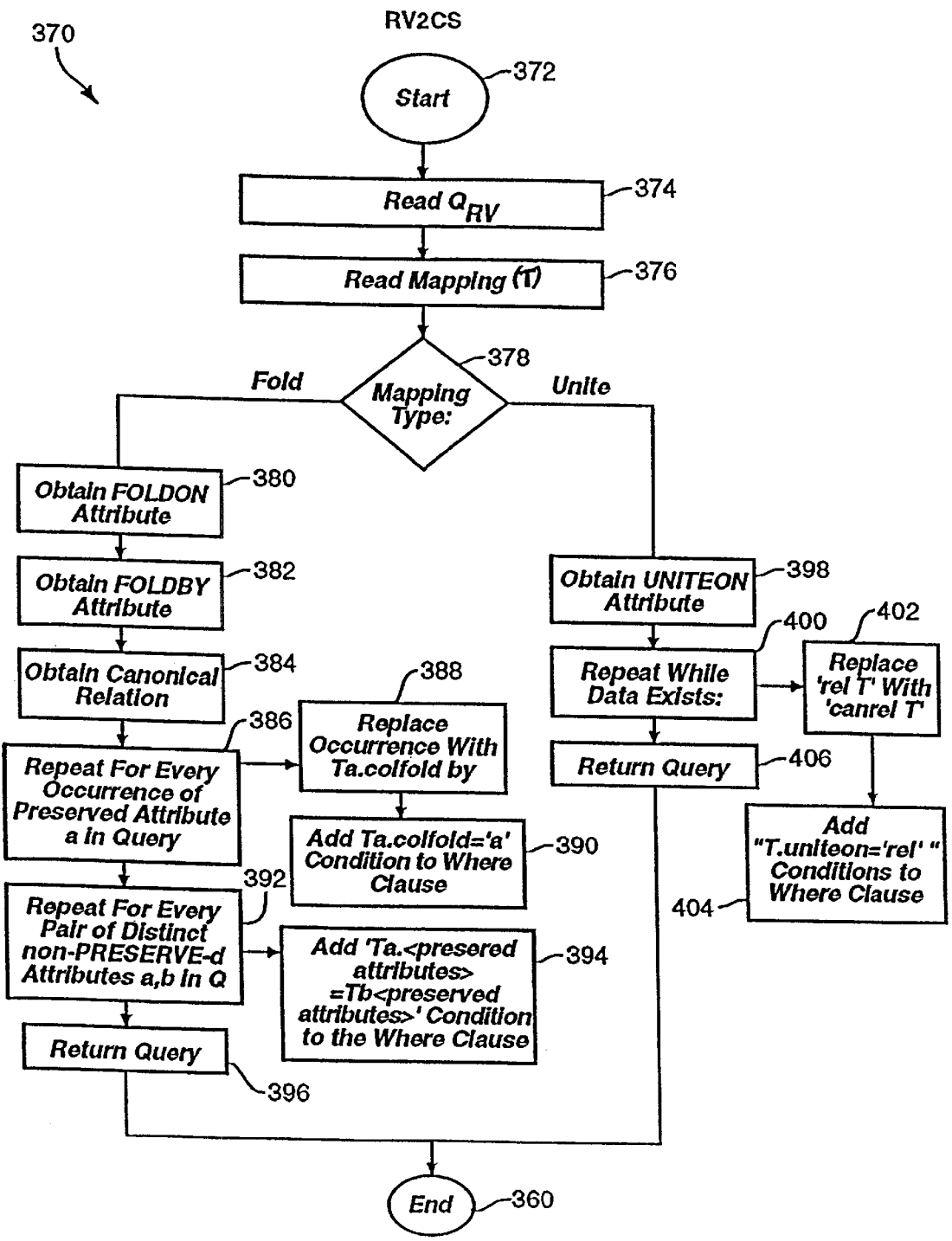
FIG. 7 is a schematic flow chart illustrating one embodiment of a restructuring views or base table schema to a canonical schema conversion operation.

One example of the operation of the RV2CS conversion module 102 is illustrated in FIG. 7 and will be discussed in greater detail below. Essentially, the RV2CS conversion module 102 references the schema mapping 85, such as the view definitions 82, and converts a query 66 on a base table 52 or a restructuring view 54, 56, 58 into a query 112 on the canonical table 92.

Figure 6:
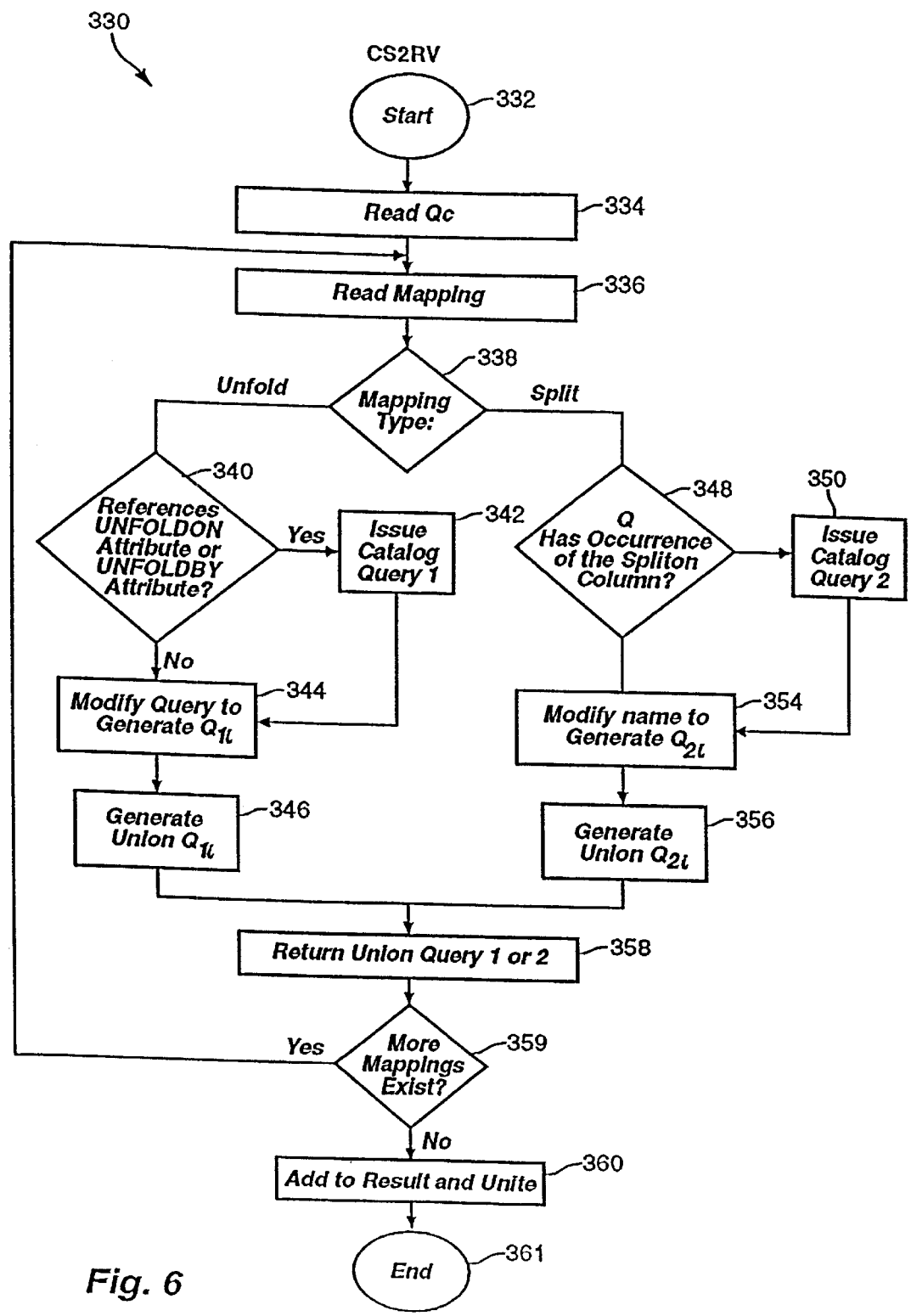
FIG. 6 is a schematic flow chart illustrating on embodiment of a canonical schema to a restructuring views schema conversion operation.

The CS2RV conversion module 104 may be employed to convert the canonical query to queries on the restructuring views 54, 56, 58. The CS2RV conversion module 104 receives as input the canonical query 112 and generates as output the alternate queries 120. One example of the operation of the CS2RV conversion module 104 is illustrated in FIG. 6 and will be discussed below in greater detail.

Figure 8:
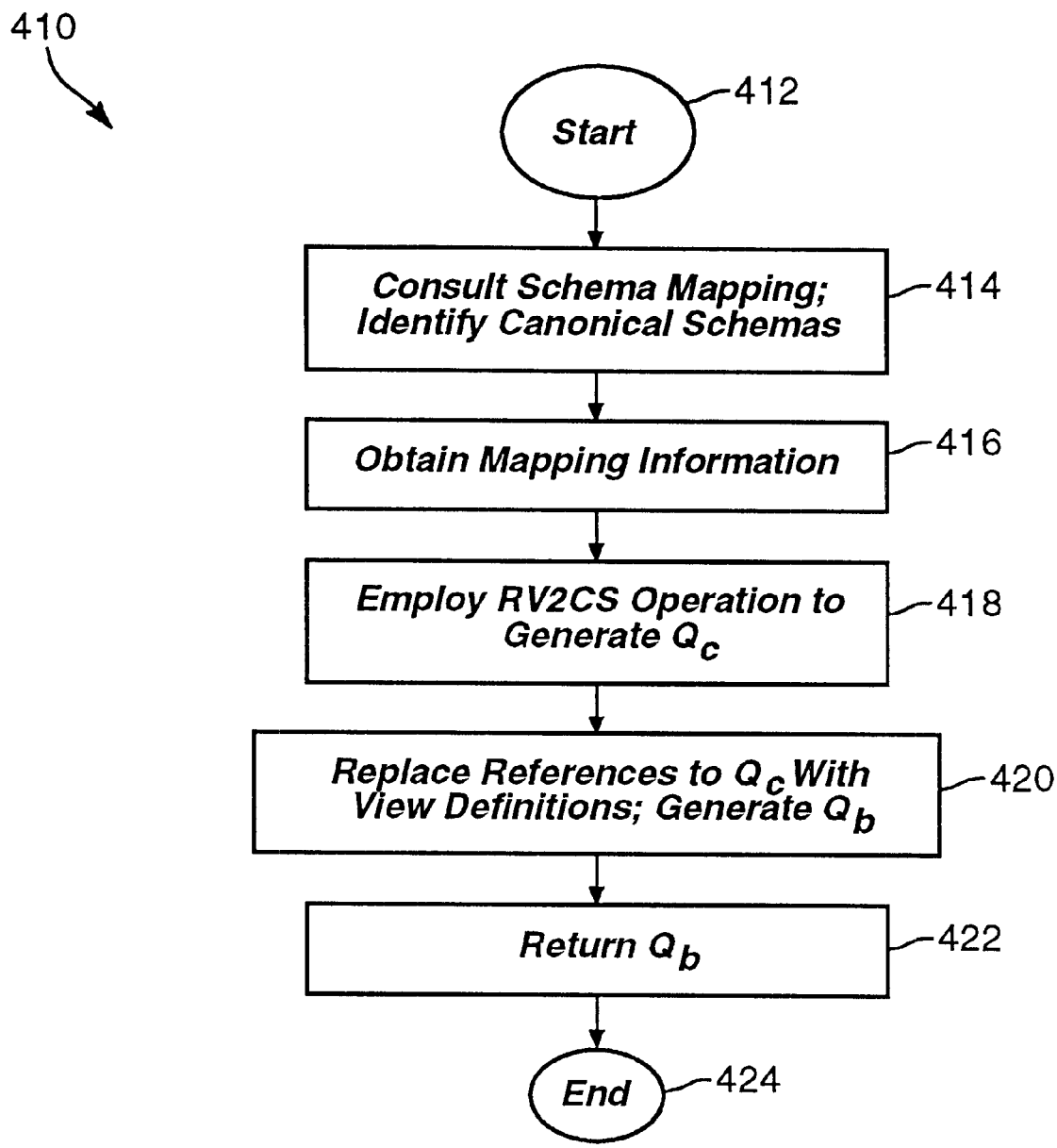
FIG. 8 is a schematic flow chart illustrating one embodiment of the operation of a base query conversion module of FIG. 2.

The base query conversion module 105 is used to convert a query 66 posed against a restructuring view 52, 54, 56 to a query 116 on a base table 52. One example of the operation of the base query conversion module 105 is illustrated in FIG. 8 and will be discussed below in greater detail.

Figure 10:
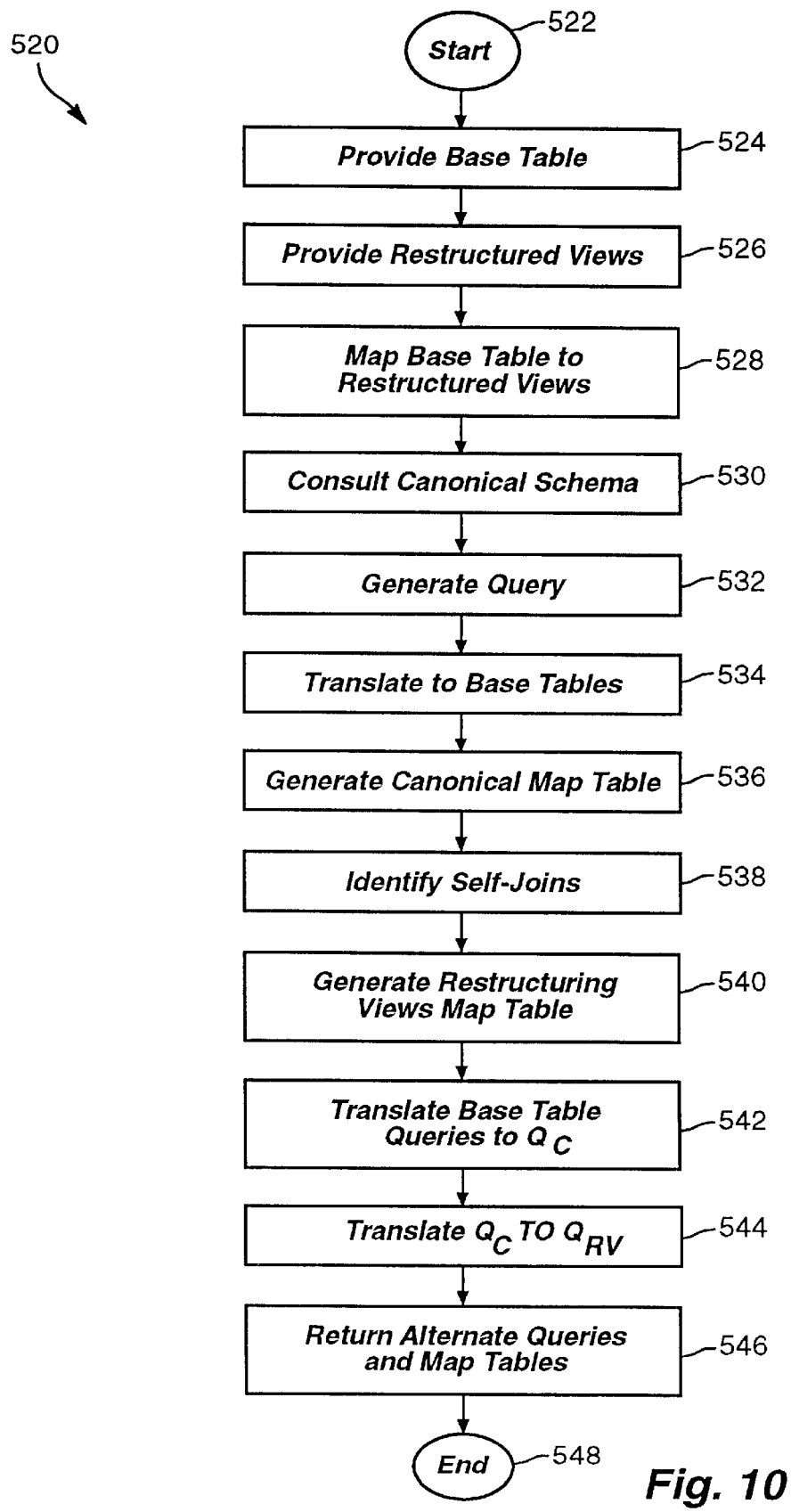
FIG. 10 is a schematic flow chart illustrating one manner of operation of a schema mapping module and a query processing module of FIG. 2.
Figure 12:
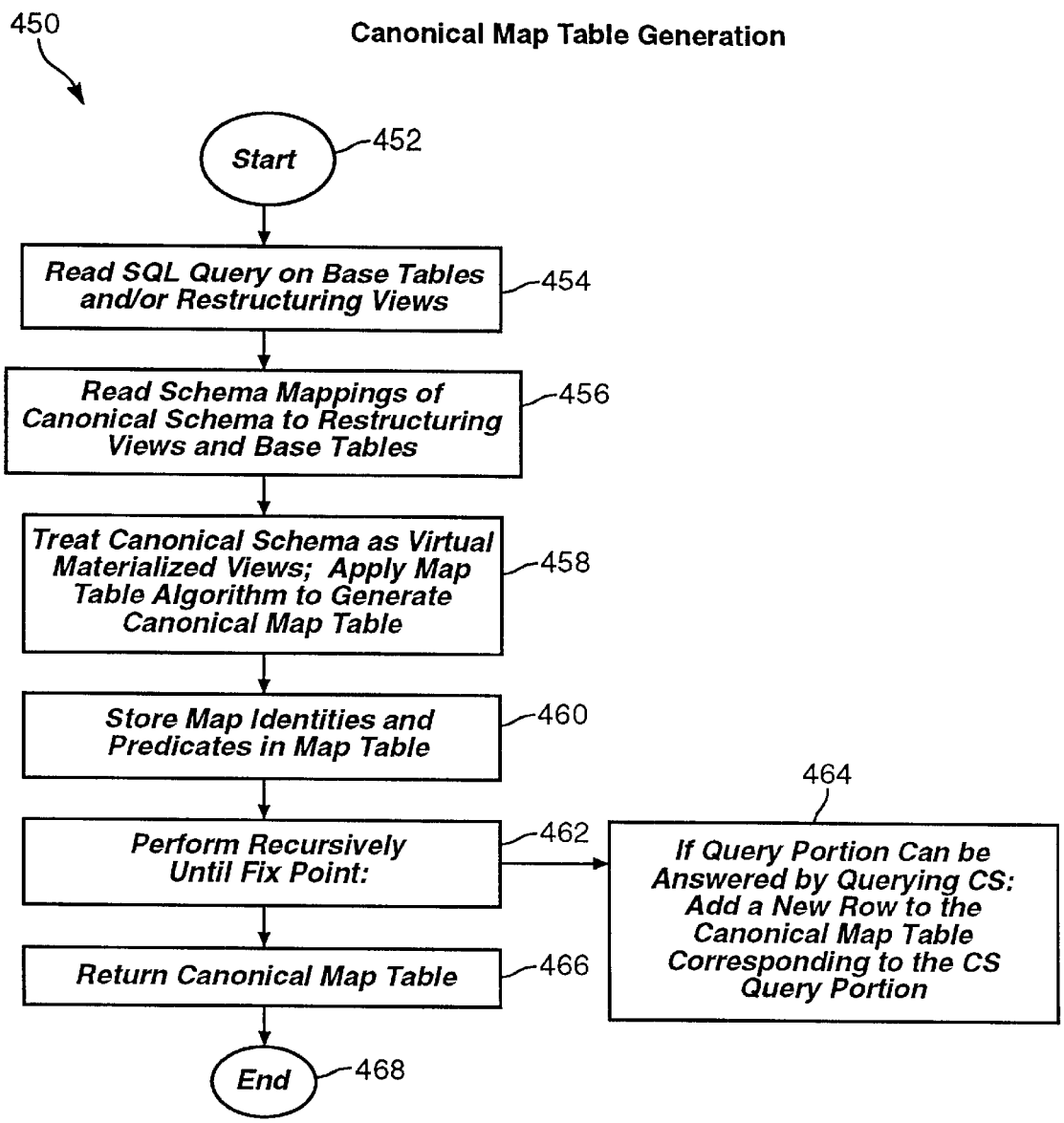
FIG. 12 is a schematic flow chart illustrating one embodiment of a canonical map table generation operation.

The canonical map table generation module 106 may be employed to generate a canonical map table 132 substantially in a manner known in the art. The canonical map table 132 is preferably used as a reference by the conversion modules 102, 104, 105 and by the query optimization module 150. One aspect of the canonical map generation module 106 is an identify self-joins module 108. One example of a canonical map table 132 is shown in FIG. 10 and one manner of generating the canonical map table 132 is shown in FIG. 12 and is described below in greater detail.

Figure 13:
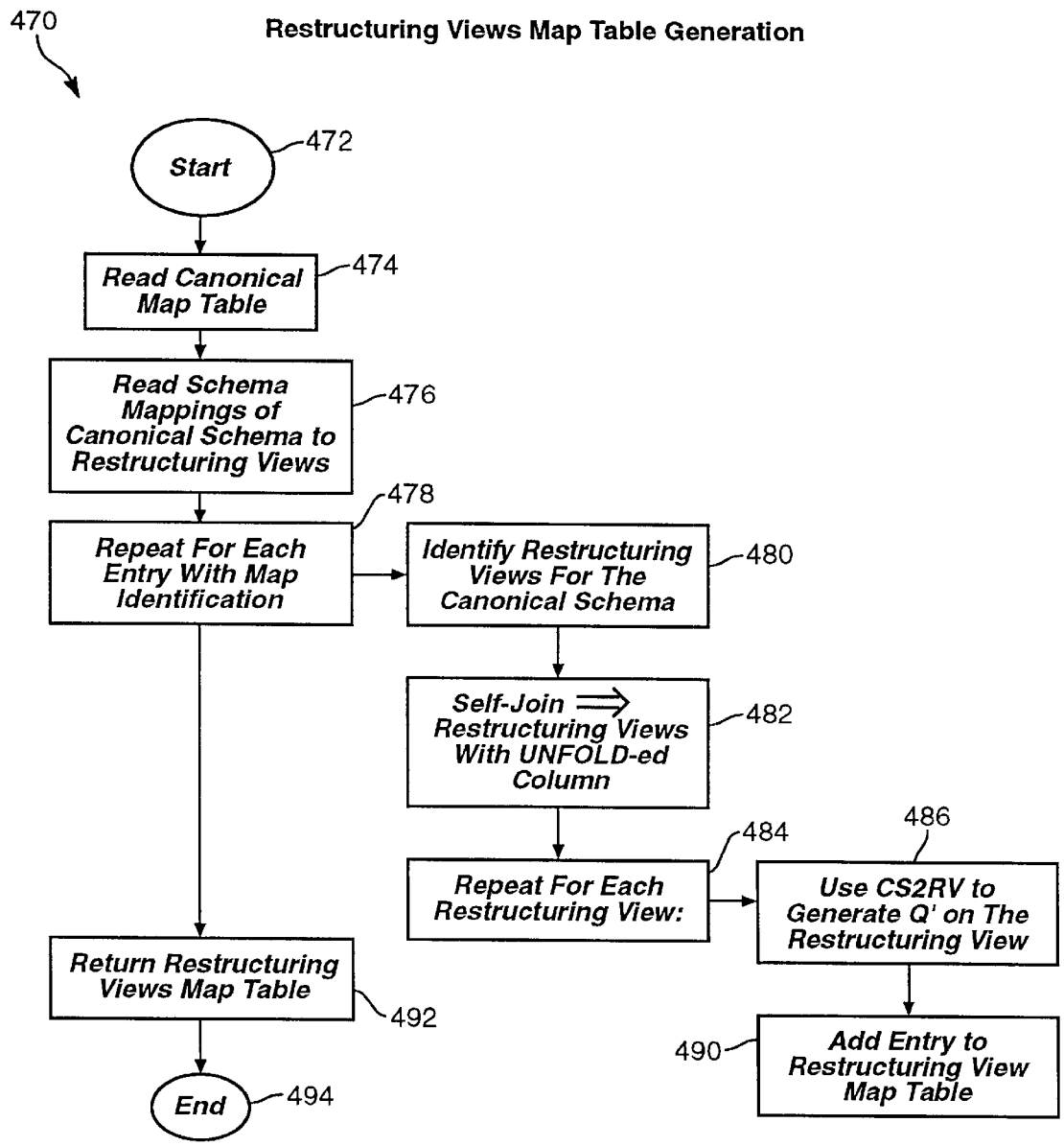
FIG. 13 is a schematic flow chart illustrating one embodiment of a restructuring views table generation operation.

In addition to the canonical map table 132, the present invention also preferably employs the restructuring views map table generation module 110 to generate a restructuring views map table 134. The restructuring views map table 134 is preferably used, in addition to the canonical map table 132, as a reference by the conversion modules 102, 104, 105 and by the query optimization module 150. One example of a restructuring views map table 134 is shown in FIG. 10 and one manner of generating the restructuring views map table 134 is shown in FIG. 13 and is described below in greater detail.

The query optimization module 150 of FIG. 2 is shown configured with a standard costing module 152, a plan enumeration module 154, and a code generation module 156. The query optimization module 150 is preferably adapted to receive the alternate queries 120, as well as, optionally, the original query 66, and optionally, the base table query 116. The query optimization module also probably receives the map tables 130 for reference in processing the queries. The query optimization module 150 formats and costs the alternate queries and base table query and produces an optimized query plan 160, utilizing one or more of the queries 120, 116 that are most efficient, and posable against one or more of the databases 51. Alternatively, the optimized query plan 160 may be constructed from a conglomerate query constructed of phrases from different queries 120, 116 and may be formatted to be posed against a combination of the databases 51 of the MDBS 55.

The optimized query plan 160 is preferably automatically serviced by the MDBS, and the query result 68 is returned to the user through the user interface. Preferably this process is fully automatic and transparent to the user, who merely generates the original query 66 and receives, in response, the query result 68. Due to the unique manner of processing of the query optimization system 50, the query result 68 is returned to the user rapidly and cost effectively.

DATABASE EXAMPLES

FIG. 3 shows a MDBS 170 containing four representative databases 170 which will be used throughout this discussion as examples. The databases 170 may or may not correspond to the databases 51 of FIG. 2. Of course, only a portion of the databases 170 are represented, in order to show the particular schemas of the databases. The databases 170 are restructuring views of each other, and as such, any of the databases 170 can be treated as the base table or the restructuring views. In the given example, all of the databases 170 are naturally occurring within a stock brokerage and are generated from a feeder database and a common set of data. Accordingly, the databases 170 contain identical data, but express the data with heterogeneous schemas which are restructuring views of each other.

A risk-analysis dept. database 172 is shown configured with an ibm relation 174 and a msft relation 184. A traders dept. database 186 is shown with an ag007 relation 188 and an ag008 relation 190. A profit-loss dept. database 192 is shown with a single relation, a buysell relation 194.

Each of the databases 170 of FIGS. 3 comprise a table name 196, one or more relations 198, relation names 199, columns 200, column names or attributes 202, rows 204, and column data 206.

SchemaSQL

As the query optimization system 50 of FIG. 2 employs the proposed SchemaSQL extension of the SQL language, it is helpful to discuss the semantics and syntax of the SchemaSQL language in greater detail. A more elaborate treatment of the language including its formal semantics and giving numerous illustrative examples is found in Subbu I.N. Subramanian, A Foundation for Integrating Heterogeneous Data Sources. PhD thesis, Department of Computer Science, Concordia University, Montreal, Canada 1997. The discussion herein references Table 1, which lists queries directed to the various representative databases 170 of FIG. 3.

TABLE 1 select distinct A
from risk-analysis –> S, risk-analysis: :S –> A
where A < > "date" and A < > "xaction"
(Q1)
select distinct T.agent
from research–> S, research: :S T
(Q2)
select distinct A
from traders–> A
(Q3)
select distinct T.agent
from profit-loss: :buysell T
(Q4)

SchemaSQL Query: "List names of all agents" on the various databases: Q1 on risk-analysis, Q2 on research; Q3 on traders; and Q4 on profit loss.

SQL queries allow variable declaration over the tuples in a relation. In contrast, SchemaSQL permits the declaration of variables that can range over (1) names of the relations in a database, (2) names of the attributes in a relation, and (3) values appearing in a column corresponding to a given attribute in a relation, in addition to tuple variables allowed in SQL. Variable declarations in SchemaSQL follows the same syntax as <range> <var> in SQL, where <var> is any identifier.

Table 1 shows the query "List names of all agents" expressed as SchemaSQL queries on the brokerage databases of FIG. 3. The simplest of them all is the query Q4 on the profit-loss database. In query Q4, T is a tuple variable that ranges over the buysell relation. The SchemaSQL syntax requires specifying the database name of the relation. Apart from this minor variation, query Q4 is also a SQL query.

Query Q3 on the traders database, on the other hand, is a SchemaSQL query that makes use of a relation name variable to list the names of all the agents. Note that the agent names appear as relation names in the traders database. In query Q3, the declaration traders→A declares A as a variable that ranges over the relation names. In the research database, the agent names appear under the agent column across all the stock relations.

Query Q2 captures this by declaring a relation variable, and A as an attribute name variable that ranges over the attribute names of the stock relations (risk-analysis: : S->A) with the provision that it does not range over the column names that are not agent names (captured by the where clause).

Besides querying, SchemaSQL also has the ability to define restructuring views of the data in databases that catapult data values to schema name positions and vice verse. For example, the brokerage firm databases of FIG. 1 can all be represented as SchemaSQL views of one another. In the following section of the restructuring operators are introduced and defined using generic SchemaSQL view definitions.

Restructuring Operators

FIG. 4 contains schematic flow charts (a) through (d) illustrating embodiments of the basic operation of the operators 72 of FIG. 2. Flowchart (a) illustrates a fold operation 210. Flowchart (b) illustrates an unfold operation 230. Flowchart (c) illustrates a split operation 250, and flowchart (d) illustrates an unfold operation 270.

The fold operator 74 can be characterized as folding column names into column data. The column names in the input relation on which the fold operator acts appear as column values in the output relation. For example, the SchemaSQL view definition V2 of table 2 below captures the ibm relation of the research database as a view of the ibm relation of the risk-analysis database. The fold operator 74 in one embodiment accomplishes a fold operation 210 of FIG. 4.

Referring to FIG. 4, the fold operation 210 will be discussed in terms of an input table and a transformed output table. The fold operation 210 starts at step 212 and progresses to a step 214 in which the processor 16 receives a SchemaSQL or other suitable view definition 82 embodying instructions for implementing the fold operation. At a step 216, in accordance with the view definition 82, a new relation is created based upon the input table and is provided with an additional column obtained from the create view clause.

At a step 218, column names from the input table are placed in the new column as column data. At a step 220, new rows are created to contain the data within previously within the columns which are being folded. At a step 222, the folded column data is placed in the new rows. At a step 224, the operation ends.

The risk-analysis department table 172 and research department table 180 of FIG. 3 illustrate one example of the fold operation 210. Applying the fold operation 210 to the risk-analysis department table 172 results in the reformation to the research department table 180. Specified column names 202 of the risk-analysis department table 172 are folded into column data 206 in the research department table 180.

The fold operation 210 can also be expressed in a particular example as a generic SchemaSQL definition in which, C1, C2, etc., denote distinct individual column names, <C> denotes a set of column names, and X, Y, T, A, etc. denote distinct variables. The view definition is as follows:

create view db::rel' (C1, C2, <C>) as
select X, Y, T.<C>
from db::rel T, db::rel→X, T.X Y
where preserveConditions (X)

In this definition, C1, C2 are not equivalent to <C>. We call C1 the foldOn column and C2 the foldBy column. The set of columns <C> is called the PRESERVE-d columns. The preserveconditions (X) statement ensures that the PRESERVE-d columns indeed get preserved in the output schema.

The unfold operator 78 is the inverse of the fold operator 74. The unfold operator 78 transports the column values in the input relation into column name positions in the output relation in an information preserving manner. For example, the relation ibm of the risk-analysis database in FIG. 3(i) is an unfold-ed representation of the relation ibm of the research database, FIG. 3(ii). This is because agents appear as column values in the latter database, and appear as column names in the former. The unfold operator 78 may be characterized by the unfold operation 230 of FIG. 4.

The unfold operation 230 starts at a step 232 and progresses to a step 234 where the processor 16 receives a SchemaSQL or other suitable view definition embodying instructions for implementing the unfold operation. In accordance with the view definition, at a step 236, column data from a specified column of the input relation are transformed into column names and placed in the output relation. At a step 238, data from rows in which each data transformed to attributes appeared is placed in rows with data from a specified column of the input relation appearing as column data for the new columns of the output relation. The unfold operation ends at a step 240.

The risk-analysis department table 172 and research department table 180 of FIG. 3 also illustrate an example of the unfold operation 230. Applying the unfold operation 230 to the research department table 180 results in a reformation to the risk-analysis department table 172. The unfold operation 230 results in specified column values in the input relation, the research department table 180 being transported into column name positions in the output relation, the risk-analysis department table 172.

The unfold operation 230 can also be expressed in a particular example as a generic SchemaSQL definition in which, C1, C2, etc., denote distinct individual column names, <C> denotes a set of column names, and X, Y, T, A, etc. denote distinct variables. The view definition is as follows:

create view db::rel' (X, <C>) as
select Y,T.<C>
from db::rel T, T.C1 X, T.C2 Y

In this relation, C1, C2 are note equivalent to <C>. We call C1 the unfoldOn column and C2 the unfoldBy column. The set of columns represented by <C> are the preserve-d columns. In the example V1 in Table 2 below, the unfoldOn column is agent and the unfoldBy column is value. Date and xaction are the preserve-d columns.

The split operator restructures a specified relation into a set of relations whose names are obtained from specified column values in the original relation. For example, the agent007 and agent 008 relations 188, 190 of the traders database in FIG. 3(iii) is a split rendering of the stock_ trades relation of FIG. 9. One embodiment of the manner of operation of the split operator 76 is illustrated by the split operation 250 FIG. 4.

The split operation 250 starts at a step 252 and progresses to a step 254 in which the processor 16 receives a SchemaSQL or other suitable view definition embodying instructions for implementing the split operation. In accordance with the view definition, at a step 256, the new relations that are to be created are specified in the view definition, which may be entered as a parameter by a user. At a step 258, specified column names are transformed to relation names. At a step 262, rows corresponding to the input relation column data placed as column names in the output relation are placed into the output relation. The split operation 250 ends at a step 264.

The traders department table 186 and profit-loss department table 192 of FIG. 3 also illustrate an example of the split operation 250. Applying the split operation 250 to the profit-loss department table 192 results in a reformation to the traders department table 186. The split operation 250 results in a restructuring of the buysell relation 194 into a set of relations ag007 (188), and ag008 (190) whose names are obtained from column values 206 in the original relation, buysell 194.

The split operation 250 can also be expressed in a particular example as a generic SchemaSQL definition in which, C1, C2 etc., denote distinct individual column names, <C> denotes a set of column names, and X, Y, T, A, etc. denote distinct variables. The view definition is as follows:

create view db::X(!C?) As
select R.!C?
From db::rel R, R.C1 X

In this relation, we call C1 the splitOn column. All the relations in db not affected by the split operator are called the preserve-d relations. In the example view definition V3 in Table 2 below, agent is the splitOn column. Assuming that there are no other relations in db, the set of preserve-d relations is the empty set. A unique characteristic of the split operator, compared to the other restructuring operators and the classical relational algebra operators is that, it takes a single relation as input and generates a set of relations as output. The split operator is the only operator in the present invention that produces a set of relations as output. Due to the nature of the split operator, a restructuring-view in general can be a set of relations in a database.

The unite operator 80 is the inverse of split operator 76. The unite operator has the effect of combining several relations conforming to the same schema into a single relation, so that the relation names of the input relations appear in the data position in the transformed schema. For example, the stock_trades relation of FIG. 9 is a result of the unite operator applied on the agent relations of the traders database in FIG. 3(iii). The unite operator 80 in one embodiment performs the unite operation 270 of FIG. 4.

The unite operation 270 starts at a step 272. At a step 274, the processor 16 receives a SchemaSQL or other suitable view definition embodying instructions for implementing the split operation. In accordance with the view definition, at a step 276, an output relation is created with a new column with a column name specified by the user, possibly through a parameter call or in response to a prompt.

At a step 278, specified relation names from the input relation are placed in the output relation in the new column. At a step 280, data rows for each occurrence of the new column name from the input relation are placed in the output relation. The unfold operation 270 ends at a step 282.

The traders department table 186 and profit-loss department table 192 of FIG. 3 also illustrate an example of the unite operation 270. Applying the unite operation 270 to the traders department table 186 results in a reformation to the profit-loss department table 192. The unite operation 270 results in a combining of specified relations, ag007 (188) and ag008 (190) into a single relation, buysell 194, so that the relation names ag007, ag008 appear in the data position 206 in the transformed profit-loss department table 192.

The unite operation 270 can also be expressed in a particular example as a generic SchemaSQL definition in which, C1, C2, etc. denote distinct individual column names, <C> denotes a set of column names, and X, Y, T, A, etc. denote distinct variables. The view definition is as follows:

create view db::rel' (C1, <C>)
select X, T.<C>
from db→X, X T
where preserveConditions (X)

In this view definition, we call C1 the uniteon column. We call the complement of the set of relations in the database on which unite acts as the preserve-d relations. The preserveConditions (X) conditions ensure that the PRESERVE-d relations indeed get preserved in the output database. In example V4 of Table 2 below, the uniteon column is agent. All relations of the traders database participate in the unite operator. So the set of PRESERVE-d relations is the empty set.

TABLE 2 create view
risk-analysis: :ibm (date, xaction, A) as
select I.date, I.xation, V
from research: :ibm I, I.agent A, I.value V
(V1)
create view
research: :ibm (date, xaction, agent, value) as
from risk-analysis: :ibm I,
risk-analysis: :ibm->A, I.A V
where A!= 'date' and A!= 'xaction'
(V2)
create view
traders: :A(date, stock, xaction, value) as
select R.date, R.stock, R.xaction, R.value
from db: :stock trades R, R.agent A
(V3)
create view
db: :stock_trades (date, stock, agent, xaction, value) as
select T.date, T.stock, A, T.xaction,
T.value
from traders-> A, A T
(V4)

Examples Illustrating the Restructuring Operations

Table 3 is a listing of the restructuring transformation among the databases 51 of FIG. 3. The preserve information for Split and Unite is the empty set in this example.

TABLE 3

| Source (db/rel) | Restructuring Expression | Destination |
| --- | --- | --- |
| research: :ibm | unfold on agent by value preserve date, xaction | risk-analysis: :ibm |
| risk-analysis: :ibm | fold on agent by value preserve date, xaction | research: :ibm |
| profit-loss: :buysell | fold on xaction by value preserve date, stock, agent; split on agent | traders |

TABLE 3-continued

| Source (db/rel) | Restructuring Expression | Destination |
|---|---|---|
| traders | unite on agent; unfold on xaction by value preserve date, stock, agent | profit - loss: :buysell |
| research | unite on stock; split on agent | traders |

MDBS Architecture

Figure 5:
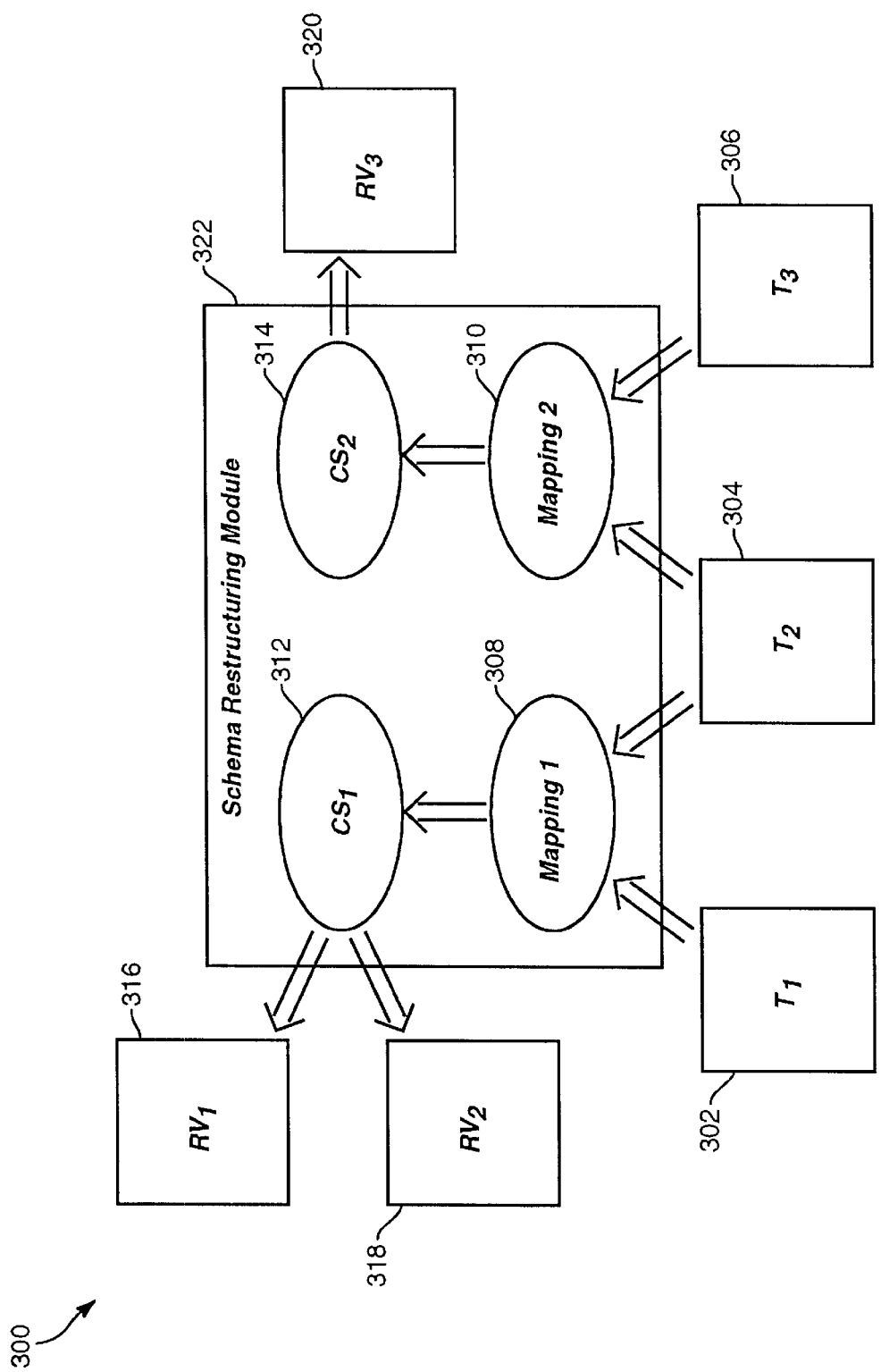
FIG. 5 is a schematic block diagram illustrating one embodiment of a MDBS containing base tables and restructuring views and a schema restructuring module for generating the restructuring views from the base tables.

FIG. 5 represents one embodiment of a MDBS data management architecture 300 suitable for use with the query optimization system 50 of FIG. 1. Also shown in FIG. 5 is a schema restructuring module 322 for creating restructuring views 316, 318, 320 from one or more base tables 302, 304, 306. Whereas the restructuring views 170 of FIG. 3 are naturally occurring, FIG. 5 illustrates an arrangement that may occur within data warehouses.

One such system is IBM's DataJoiner™. DataJoiner is a heterogeneous database system that provides a single database image of multiple databases and provides transparent access to tables at remote databases through user defined aliases that can be accessed as local tables. DataJoiner is also a fully functional relational database system. Quefies submitted to the MDBS are optimized using a cost based optimizer that has knowledge of the remote optimizer capabilities to generate an optimal global plan.

In FIG. 5, the schema restructuring module 322 is used to transform the base tables 302, 304, 306 into restructuring views 316, 318, 320. In so doing, a mapping 308, 310 is first generated capable of transforming the base tables into the canonical schema. From the canonical schema 312, 314, the base tables 302, 304, 306 are transformed into restructuring views 316, 318, 320. The system is preferably managed by a system such as DataJoiner® which implements the query optimization system 50 of FIG. 2 to promote rapid querying and analysis of data within the base tables 302, 304, 306.

Conversion Operations

FIG. 6 illustrates one manner of implementing the CS2RV conversion module 104 of FIG. 2. FIG. 6 depicts a CS2RV operation 330 which starts at a step 332. At a step 334, the a processor 16 executing the operation 330 receives and reads a query $Q_c$, a query on the canonical schema (e.g. the query 112 of FIG. 2). At a step 336, a schema mapping 85 such as the mappings 308, 310 of FIG. 5, which may be SchemaSQL view definition, is received by the processor 16 and read.

The CS2RV operation 330 branches at a query step 338. At step 338, the CS2RV operation 330 references the particular type of the mapping received at step 336. The operation 330 successively processes each unfold and split operation and unites them at the end. Thus, the operation 330 at block 338 checks the statements in the schema mapping 85, and if the next successive statement involves an Unfold operator 78, the CS2RV operation progresses on to a step 340. If the mapping involves a Split operator 76, the CS2RV operation 330 progresses to a step 348.

At the step 340, the CS2RV operation 330 once again branches. The CS2RV operation 330 checks whether the mapping references an UNFOLDON OR UNFOLDBY attribute. If so, the CS2RV operation proceeds to a step 342. At step 342, a catalog query is issued that is preferably a query against metadata (relation and column names) references in the schema mapping 85. One example of a suitable catalog query is:

| select | columnname |
|---|---|
| from | syscolumns |
| where | rename = 'rel' and columnname != <preserved columns> and pred(columnname) | where pred(columnname) is a condition derived from a condition of the form Pred(unfoldon) relevant to the tuple variable, present in the where clause.

At a step 344, the CS2RV operation 330 modifies the query $Q_c$ to generate new queries. The modification in one embodiment takes the form:

Let col1, col2 be two distinct elements in the output of step (1). For every distinct pair of tuple variables that reference the unfoldon attribute in Q, replace the occurrence of the attributes with 'col1' and 'col2'. For every pair of corresponding occurrences of the unfoldBy attribute in Q, replace it with col1 and col2.

At a step 346, the CS2RV operation 330 generates a union query $Q_1$ that is a union of all the queries generated in step 344.

Returning to step 348, if the CS2RV operation 330 branches to step 348, a check is made to see if the query 112 has the occurrence of the spliton column. If so, at a step 350, a catalog query is issued. The catalog query may be of the form:

| select | relname |
|---|---|
| from | sysrelations |
| where | pred(rename) | where pred(rename) is a condition derived from a condition of the form pred(spliton) present in the where clause of Q.

At a step 354, for each element rname in the output of the query in step 350, a query is generated by modifying $Q_c$ in the following manner:

replace every occurrence of spliton attribute in Qc with 'rname'; replace the reference to rel in the from clause of Qc to rname.

At a step 356, a union query $Q_2$ is generated that is a union of all the queries generated in step 354. At a step 358, the CS2RV operation returns either the union query Q1 or the union query Q2, depending upon the branch at step 338. At a step 359, the operation 330 checks to see if any more statements containing unfold or split operators exist. If so, the operation 330 returns to the block 336 and repeats. If no further mapping statements exist, at a step 360, the results previous iterations of the operation 330, if any, are added to a final result and united. At a step 360, the operation 330 ends. One embodiment of the CS2RV operation 330 is illustrated in Example 1:

Consider the canonical table stock trades of FIG. 9, and the query "List the dates and value of ibm stocks sold by ag007 such that the value exceeds the value of ibm stocks sold by ag008 on the same day" (Query Q1 of Table 1 above) expressed against the stock_trades table of FIG. 9.

```
select      A.date, A.value
from        stock_trades A, stock_trades B
where       A.stock = 'ibm' and A.agent = 'ag007' and
            B.stock = 'ibm' and B.agent = 'ag008' and
            A.stock = B.stock and A.date = B.date and
            A.xaction = B.xaction and
            A.xaction = 'sell' and A.value > B.value
```

Our algorithm will translate this query against the risk-analysis database in the following manner. Note that the transformation is an unfold allowed by a split. The unfoldOn attribute is agent and the unfoldBy attribute is value. The catalog query of step 1 will generate a unary relation consisting of all the agent names. Step 2 will generate the SQL query Q1 of FIG. 7 in a mechanical fashion. Based on our algorithm, the split transformation will induce the rewrite shown as query Q2.

```
Select      A.date, A.ag007
from        ibm A, ibm B
where       A.date = B.date and
            A.xaction = B.xaction and
            A.xaction = 'sell' and
            A.ag007 > B.ag008
```

Query Q2

Note that the algorithm factors in the predicates A.stock='ibm' and
B.stock='ibm' while generating the SQL query. Finally, query Q2 will get rewritten into:

```
select      A.date, A.ag007
from        ibm A
where       A.xaction = 'sell' and A.ag007 > A.ag008.
```

EXAMPLE 1

FIG. 7 illustrates one manner of implementing the RV2CS conversion module 102 of FIG. 2. FIG. 7 depicts a RV2CS operation 370 which starts at a step 372. At a step 374, the processor 16 executing the operation 330 receives and reads a query $Q_{RV}$, a query on a restructuring view 54, 56, 58 or base table 62 (e.g. the query 66 of FIG. 2). At a step 376, a schema mapping 85 such as the mappings 308, 310 of FIG. 5, which may be a SchemaSQL view definition, is received by the processor 16 and read.

The RV2CS operation 370 branches at a query step 378. At step 378, the RV2CS operation 370 references the particular type of the mapping for each statement received at god 24 step 376. If the mapping involves a Fold operator 74, the RV2CS operation 370 progresses on to a step 380. If the mapping involves a Unite operator 80, the RV2CS operation 330 progresses to a step 398.

At step 380, the FOLDON attribute is obtained and defined to be colfoldon. At a step 382, the FOLDBY attribute is obtained and defined to be colfoldby. At a step 384, a canonical relation canrel is obtained.

At a block 386, the operation 370 loops for every occurrence in the select clause and/or the where clause of a PRESERVE-d attribute a in the query Q. For every loop, at a step 388, the occurrence is replaced with a ta.colfodlby. At a step 389 in the loop, a declaration canrel Ta is added to the from clause. At a step 390, conditions in the form of ta.coldfoldon='a' are added to the where clause.

At a step 392, the operation 370 loops to repeat for every pair of distinct non-PRESERVE-d attributes a, b in the query Q. Within the loop, a step 394 adds a condition to the where clause of the form 'Ta.<preserved attributes>.' At a step 396, the resulting query is returned.

When the operation 370 identifies a unite operator and branches to the step 398, a UNITEON attribute is obtained and defined to be uniteon. At a step 400, the operation 370 loops for every declaration in the from clause of a non-PRESERVE-d relation 'rel t' in Q. Within the loop at a step 402, 'rel T' is replaced with 'canrel T.' At a step 404 within the loop, conditions are added to the where clause of the form "T.uniteon='rel.'"

At a step 406, the resulting query is returned. At a step 408, the RV2CS operation 370 ends.

Base Table Query Generation

FIG. 8 is a schematic flow chart illustrating one manner of operation of the base table query conversion module 105 of FIG. 2. As discussed, when the query 66 is posed against one of the restructuring views 54, 56, 58, rather than against a base table 52, or when other base tables exist within the MDBS 55 (e.g., as in the MDBS 300 of FIG. 5), the query 66 is preferably converted to a query 116 against the base table before being converted to queries 120 on the others of the restructuring views.

In one embodiment, the conversion operation 410 begins at a step 412 and progresses to a step 414 in which the operation 410 consults a catalog of metadata within the schema mapping 85 to identify the canonical schemas corresponding to the restructuring-views referenced in the query 66. At a step 416 mapping information between the restructuring-view and its corresponding canonical schema is obtained.

At a step 418, the RV2CS conversion module 102 is employed to generate the canonical query 112. As discussed above, the RV2CS conversion module 102 may operate in the manner described above for the RV2CS operation 370 of FIG. 7. The information obtained in steps 412 and 414 is referenced by the RV2CS conversion module 102 in step 418.

At a step 420, the operation 410 checks to see if the canonical schema is defined as a view on a base table, and if so, references to the canonical query 112 are replaced with view definitions 82. At a step 422, the thusly generated base query 116 is returned. At a step 424, the operation 410 terminates.

Example 2 illustrates the usage of the base table query generation operation 410 of FIG. 8:

Consider the scenario where the brokerage firm of our example involving FIG. 3 contains another base table agent_trades 428 (of FIG. 9) that has the schema (date, agent, xaction, stock, value, commission). For the sake of simplicity, we assume agent_trades is a single table, but in real life it may be a join of two base tables. The canonical table stock trades can be expressed as the following simple view on the agent_trades table.

create canonical table stock_trades (date, agent, xaction, stock, value) as select date, agent, xaction, stock, value from agentTrades Now, consider the query "List the dates and value of ibm stocks sold by ag007 such that the value exceeds the value of ibm stocks sold by ag008 on the same day" (from Table 1) expressed against the traders dept. database 186 of FIG. 3. The user query is the query UQ of Table 4 below. The RV2CS operation translates query UQ to query CQ on the canonical schema. Since the stock_trades relation, we make use of this view definition to rewrite the above query to a query on the base table. The resulting query is the query BQ in Table 4.

Example 2

```
    select A.date, A.value
    from ag007 A, ag008 B
    where A.stock = 'ibm' and
        A.xaction = 'sell' and A
        B.stock = 'ibm' and
        B.xaction = 'sell' and
        A.date = B.date and
        A.value > B.value
(UQ)
    select A.date, A.value
    from agentTrades A, agentTrades B
    where A.stock = 'ibm' and A.xaction = 'sell' and
        B.stock = 'ibm' and B.xaction = 'sell' and
        A.agent = 'ag007' and B.agent = 'ag008' and
        A.date = B.date and A.value ? B.value
(BQ)
    select A.date, A.value
    from stock_trades A, stock_trades B
    where A.stock = 'ibm' and
        A.xaction = 'sell' and
        B.stock = 'ibm' and
        B.xaction = 'sell' and
        A.agent = 'ag007' and
        B.agent = 'ag008' and
        A.date = B.date and
        A.value > B.value
(CQ)
```

Query submitted by the user. CQ: Translated query on the canonical schema. BQ: The user query expressed on the base tables.

Canonical Schema

The restructuring operators of the previous section, by blurring the distinction between data and meta-data, provide a framework where seamless querying of both data and schema is possible. From a practical perspective, the need for querying schema components arises because the tokens that the application treats as data appears as a schema component in the database. The notion of canonical schema introduced in this section is based on the observation that if all the objects of query-able interest are modeled as data, the application can express its queries in any first-order query language (such as SQL) and would not need the capability for metadata querying. Thus, canonical schema is a central component in our query processing architecture.

The canonical schema of the present invention is the same as the first-order schema presented in Miller R. J., Using Schematically Heterogeneous Structures, published in: In Proceedings of the ACM SIGMOD Conference, pages 189–200, Seattle, Wash., May 1998. We first define the canonical schema and then present a result that brings out the power of the restructuring operators.

Definition of Canonical Schema. Given a set of queries Q, a relational schema S is called a canonical schema relative to Q if all queries Q can be expressed as first-order queries on S. For example, the schema of the relation Stock_trades of FIG. 9 is a canonical schema relative to the queries we have considered so far in this paper because all objects of query-able interest, namely date, stock, agent, xaction, and value, are modeled as data. We now present the following theorem that establishes the power of the restructuring algebra.

Let V be a restructuring-view, Q be a set of queries on V, and S be a canonical schema relative to Q. There exist expressions τ, τ' consisting only of the restructuring operators such that for every instance $V_1$ on V,
(1) $\tau(V\ I)=S_I$ is an instance of S,
(2) $\tau'(S_I)=V_I$ and
(3) $S_I$ satisfies the following property:
∀ Q ∈ Q, there exists a first-order query Q' on S such that $Q(V_I) \equiv Q'(S_I)$.

Proof Sketch: There are two parts of this proof. The first part proves that the transformation has the ability to restructure a schema to a canonical schema and back. The proof is based on the observation that the operators retain the canonical schema information every step of the way. The second part proves that the transformation is performed in an information preserving manner. The proof for the this draws on the semantics of SchemaSQL. The details are presented in Miller.

The present invention makes use of the above result to formulate operations for restructuring-views based query processing and optimization. For example, the operations CS2RV 330 and RV2CS 370 are based on the ability to translate queries on the restructuring-views to the canonical schema and to translate queries on the canonical schema back to queries on the restructuring-views.

FIG. 9 shows one embodiment of a canonical table 426 presented as a representative example of the canonical table 92 of FIG. 2. The canonical table 426 is entitled stock_trades. The stock_trades canonical table 426 of FIG. 9 is generated based upon the restructuring views tables 52, 54, 56, 58 of FIG. 2. The agent trades_table 428 of FIG. 9 is used in examples herein.

Method of Operation of Query Optimization System

Figure 14:
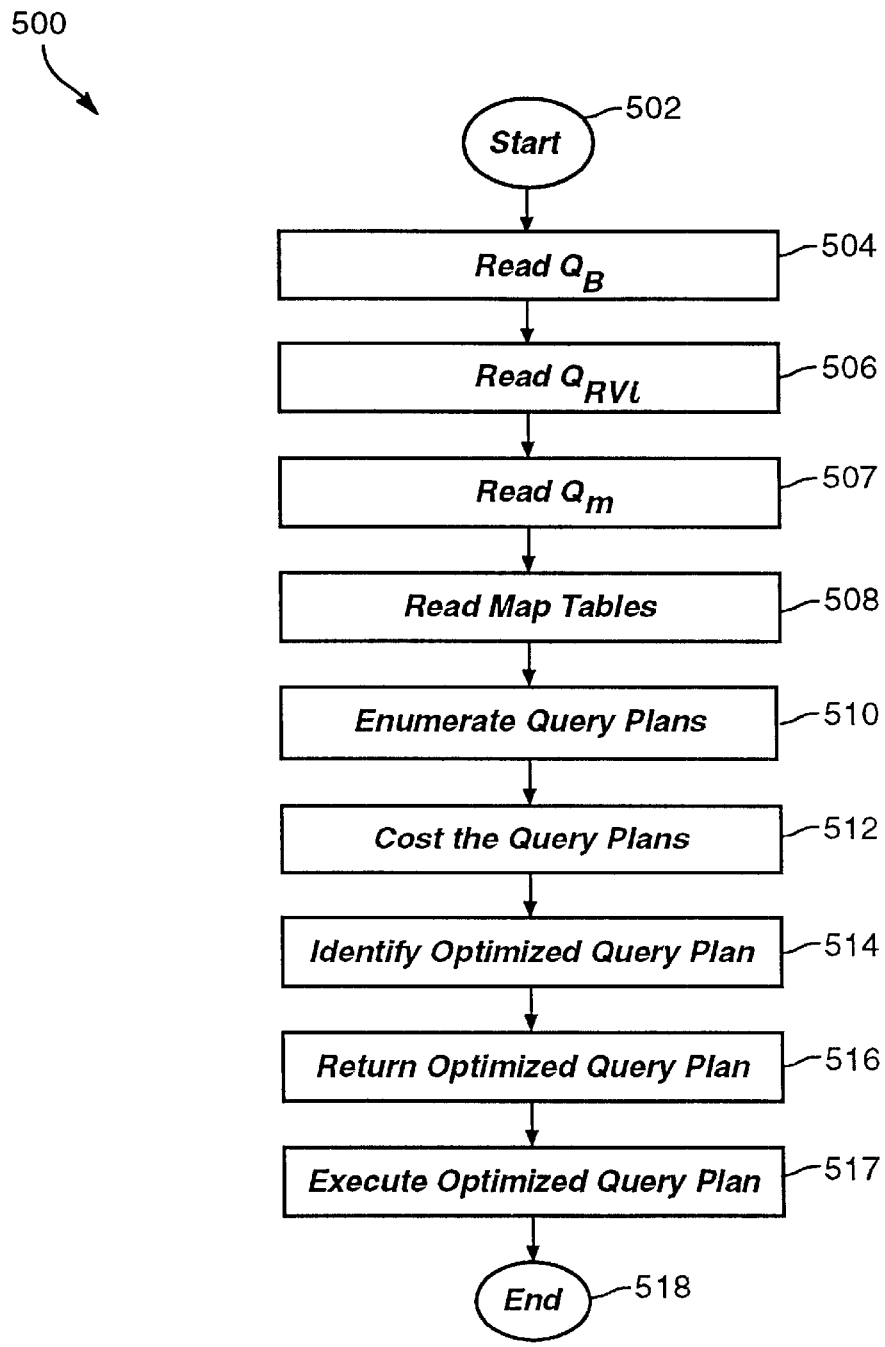
FIG. 14 is a schematic flow chart illustrating one manner of operation of a query optimization module of FIG. 2.

FIG. 10 shows one embodiment of a method 520 of operation of the schema mapping module 70 and query processing module 100 of FIG. 2. FIG. 14 shows one embodiment of a method 500 of operation of the query optimization module 150 of FIG. 2.

The method 520 of FIG. 10 starts at a step 522. At a step 524, a base table is provided. In the depicted embodiment of FIG. 2, the base table is the table 52 of the MDBS 55. At a step 526, restructuring views are provided. In FIG. 1, the restructuring views are the tables 54, 56, 58. As discussed above, the MDBS 55 could be provided with all naturally occurring databases 51, in which case, we do not necessarily refer to a base table. As discussed for the MDBS 300 of FIG. 5, multiple base tables may exist, and the restructuring views may be artificially constructed as part of a data warehouse, and may be created with a schema restructuring module 322.

At a step 528, a schema mapping 85 is preferably generated mapping the restructuring involved between the heterogeneous schemas 60 of the base table(s) and the restructuring views. The schema mapping 85 may, in one embodiment take the form of SchemaSQL views, as described, and may employ operators such as the restructuring operators 72 of the present invention.

At a step 530, a canonical schema is preferably identified for the mapping of the base table to the restructuring views, preferably with a module such as the canonical schema module 75. The canonical schema may take the form of a canonical table 92, one example of which is the stock_trades relation 426 of FIG. 9.

At a step 532, an original query 66 is generated. The query 66 may be posed against the base table 52, the restructuring views 54, 56, 58, or against the canonical table, which may or may not be a view, and which may or may not be materialized, as discussed.

At a step 534, the query 66 may be translated to a query 116 on the base tables. In so doing, the base table query conversion module 105 may be employed, and may be used in the manner described above for FIG. 8. Step 534 need not be employed, of course, if query 66 is posed against the bast table 52 as shown by the dashed line 65, and where other base tables are not included within the query optimization system 50.

At a step 536, the canonical map table 132 may be generated. The canonical map table 132 is preferably generated using the canonical map table generation module 106, which may employ an operation such as a canonical map table generation operation 450 shown in FIG. 12 and discussed in greater detail below. One example of a canonical map table 430 is shown in FIG. 11. As discussed, the canonical map table 112 is preferably used as a reference by the RV2CS operation 102 and the CS2RV operation 104 and by the query optimization module 150.

As part of the canonical map table generation, at a step 538, self-joins in the query 66 are preferably identified. The occurrences of the self-joins are included in the canonical map table as in a manner to be described.

At a step 540, a restructuring views map table 134 is preferably generated. The restructuring views map table 134 is preferably an adjunct to the canonical table map table 132 and is used in a similar fashion, as discussed. One example of a restructuring views map table 438 is shown in FIG. 11. One embodiment of a method 470 of generation of the restructuring views map table 134 is shown in FIG. 13 and is discussed below.

At step 542, the base table query or queries 116 are translated to a canonical query 112. The translation or conversion is in one embodiment conducted by the RV2CS algorithm, which preferably operates as described above for FIG. 7. Step 542 may need to be repeated where there are multiple base table queries, e.g., as a result of step 534 and situations such as in FIG. 5 where multiple base tables 302, 304, 306 and canonical schemas 312, 314 exist.

At a s step 544, the canonical query 112 is translated to alternate queries 120 on the restructuring views 52, 54, 56. The translation or conversion is in one embodiment conducted by the CS2RV algorithm, which preferably operates as described above for FIG. 6. Step 544 may be repeated for each of the restructuring views 52, 54, 56 in the MDBS 55.

At a step 546 the alternate queries 120 are returned together with the generated map tables 130. The returned queries may include the original query 66 and one or more queries 116 on the base tables, as well as queries 120 posed against one or more of the restructuring views 54, 56, 58. At a step 548, the method 520 ends.

Map Tables and Map Table Generation

In the query processing module 100 of the present invention, the translated query 116 on the base tables is used to generate data structures referred to herein as the map tables 130. For a discussion of conventional Map Tables, reference is made to S. Chaudhuri, R. Krishnamurthy, S. Potamianos, and K. Shim, Optimizing Queries with Materialized Views, In Proceedings of the IEEE Conference on Data Engineering, March 1995.

Map Tables store the plan alternatives for subexpressions in the input query and are used by the query optimizer to evaluate the various possible ways of executing the query. The present invention constructs the Map Table by identifying the portions of the query that can be answered by querying the canonical schema and/or the restructuring-views. The present invention adapts the Map Table generation algorithm of Chaudhuri for this purpose. Herein, the Chaudhuri Map Table algorithm is referred to as the CKPS algorithm. Unlike the CKPS algorithm that has one Map Table, the present invention preferably maintains two Map Tables—the canonical Map Table 132 and the restructuring-views Map Table 134 to store the plan alternatives information. The canonical Map Table 132 is similar to the Map Table of Chaudhuri with the exception that the predicates applied to the quantifiers are preferably stored in the table along with the quantifiers.

The restructuring-views Map Table 134, on the other hand, is a new table introduced as part of the present invention. It has two columns, an ID column 440 and a restructuring view query column 442 in which information on the plan alternatives involving restructuring-views is stored.

We describe the canonical Map Table generation in this section. Below, we describe how the restructuring-views Map Table 134 is generated from the canonical Map Table 136. The canonical Map Table 136 is generated by identifying phrases from the query 66 that can be replaced with phrases of the query 112 on the canonical schema 92. The canonical Map Table 132 has three columns, an ID column 432, a delete query column 434, and a canonical query column 436. The ID column 432 is a unique identifier for each phrase entry. The delete query column 434 corresponds to a subexpression in the original query 66. The canonical query column 436 is the added query phrase that corresponds to an equivalent query 112 on a canonical schema 92 that can be used to replace the corresponding phrase from the original query 66.

Unfold and Its Impact

The example in Table 1 illustrates a subtlety involving the unfold operator 78. The simple selection query Q1 of Table 1 on the unfold-ed table translates to a self-join query on a fold-ed table in queries Q2, Q4. In other words, a self-join query on the canonical table 92, under the right conditions, can be translated into a selection query on a restructuring-view. However, the traditional Map Table algorithm does not consider the possibility of replacing a self-join with a single table access query. We account for this in the canonical map table generation operation 450 of FIG. 12 by identifying self-join queries and adding a corresponding entry to the canonical Map Table 132.

FIG. 11 illustrates the entries in the Canonical Map Table 430 for the query (on table agent_trades) of Example 2. The first two entries indicate that the query on the agent_trades table 428 (of FIG. 9) can be replaced with a query on the stock_trades table 426 (of FIG. 9). The third entry in the table is created by analyzing the first two entries in the Map Table 430. The entries in the Map Table 430 of FIG. 11 correspond to: (1) The canonical table stock trades have unfold-ed counterparts in the risk-analysis database; (2) The delete query on id's 1 and 2 have selections on the column agent; and (3) The user query UQ of Table 4 has a join on the column date and xaction.

FIG. 12 is a schematic flow chart diagram illustrating a canonical map table generation operation 450. The operation 450 starts at a step 452. At a step 454 the SQL query 116 on the base table 52 and/or one of the restructuring views 54, 56, 58 is received and read by the processor 16. At a step 456, schema mappings of the canonical schema 92 to the base table 52 or restructuring views 54, 56, 58 is received and read by the processor 16.

At a step 458, the canonical schemas are treated as virtual materialized views, and the CKPS map table algorithm (discussed above) is applied to generate a basic canonical map table. At a step 460 map identifier and predicates on the canonical schema are stored in the map table.

At a step 462, the operation 450 loops recursively and performs recursively until fix point the step 464. The step 464 first asks if the query portion being examined can be answered by querying CS. If so, step 464 adds a new row to the canonical table corresponding to the CS query portion. Step 464 may take the form of the following operation:

Let CS (R) denote the canonical schema, $Q_{del}$ (R) denote the delete query, and $Q_{can}$ (R) denote the canonical query on CS (R), of a row R in the MapTable.

If two rows R1 and R2 on the canonical MapTable satisfy the following criteria:
(1) CS (R1)=CS (R2)=CS, and unfold-ed restructuring-view is defined on CS with unfoldOn column unfoldon, unfoldBy column unfoldby, and a set of preserved columns preserve-set, and
(2) $Q_{del}$(R1) and $Q_{del}$(R2) are selection(s) on unfoldon column, and
(3) input query Q has a join condition between literals of $Q_{del}$ (R1) and $Q_{del}$ (R2) on the preserve-set columns, then Add a new row R3 to the canonical MapTable:
$Q_{del}$ (R3)=$Q_{del}$(R1), $Q_{del}$ (R2), join condition between literals of $Q_{del}$(R1) and $Q_{del}$(R2) on the preserve-set columns; Qcan(R3)=$Q_{can}$ (R1),
$Q_{can}$(R2), join condition between literals of $Q_{can}$ (R1) and $Q_{can}$(R2) on the preserve-set columns.

At a step 466, the canonical table 132 is returned. At a step 468, the operation 450 ends.

Each entry of the canonical MapTable generated by the operation 450 has information to replace a portion of the query 66 with a query 112 on the canonical schema 92. Since the canonical schema is a virtual materialized view 'proxying' for the restructuring-views which contain the actual data, these queries in turn have to be translated into queries on the restructuring-views which contain the actual data, these queries in turn have to be translated into queries on the restructuring-views. This is accomplished via the CS2RV algorithm of FIG. 6. For a given query, there may be multiple translations involving restructuring-views since more than one restructuring-view may map to the same canonical schema.

These alternatives are captured in the restructuring-views MapTable. This table has two entries, the first entry is the map ID 440 that identifies a corresponding entry in the canonical MapTable 132 and the second entry is an equivalent query on the restructuring-views(s). FIG. 13 describes how the restructuring-views MapTable is generated.

In the restructuring views map table 438 of FIG. 11, the first four entries are the alternatives for processing the first entry in the canonical MapTable. The four entries following that in the restructuring-views table are the alternatives for the second entry in the canonical MapTable. Note how the third entry of the canonical MapTable gets translated-the CS2RV operation of FIG. 6 converts the self-join query to a simple select query because of the unfold restructuring. The query graph, the canonical MapTable and the restructuring-views MapTable are sent to the plan enumeration phase of the query optimization.

FIG. 13 illustrates one embodiment of a restructuring views map table generation operation 470. The operation 470 starts at a step 472 and proceeds to a step 474 where the canonical map table is received and read by the processor 16. At a step 476, the schema mappings 85 mapping the canonical schema 92 to the restructuring views 54, 56, 58 is received and read by the processor 16. At a step 478 the operation 470 loops and repeats for each entry with a common map identification number in the ID column 432 of the canonical table 132.

The loop steps include steps 480, 482, and 484. At a step 480, the mapping information in the schema mapping 85 is queried to identify the set of restructuring views for the canonical schema. At a step 482, for each selfjoin query in the canonical map table, the restructuring view with the unfold-ed column is considered.

At a step 484, the operation 470 loops and repeats steps 486 and 490 for each restructuring view $rv_j$. At step 486, the CS2RV conversion module 104 together with the attendant operation of FIG. 6 are used to generate equivalent query Q' on each restructuring view $rv_j$, such that $CQ_m(CS) \equiv Q'(rv_j)$. At step 490, the entry<m, $Q'(rv_j)$> is added to the restructuring views map table.

At a step 492, the generated restructuring views map table 134 is returned. At a step 494 the operation 470 ends.

Query Optimization

FIG. 14 illustrates one method 500 of operation of the query optimization module 150 of FIG. 2. The method 500 may be used independently of the method 450 of FIG. 10 or may be performed in conjunction with the method 450 of FIG. 10.

The method 500 begins at a start step 502. At a step 504, the processor 16 receives and reads the query 116 on the base table(s) 52. Preferably, the query has been optimized with standard query manipulation processes prior to being submitted. These query manipulation processes typically include processes such as parsing.

At a step 506, the processor 16 receives and reads the alternate queries 120 on the restructuring views 54, 56, 58. At a step 507, the processor 16 optionally receives and reads one or more queries against a materialized view that is not a restructuring view of other tables in the MDBS. The query optimization system 50 of the present invention is flexible in that if materialized views are present, queries on the materialized views may be generated in manners known in the art and returned together with or in place of the queries 120 on the restructuring views. Similarly, the query 116 on the base tables may be read in or not, where applicable.

At a step 508, the map tables 132, 134 are read by the processor. At a step 510, the plan enumeration module 154 is preferably employed to generate a number of alternative query plans. The operation of one embodiment of a plan enumeration module is described below. At a step 512, the alternative query plans generated at step 510 are costed to identify the query plan executable at a least cost. The costing of each submitted query plan is conducted by the costing module 152 to determine which of the query plans has the lowest cost. The costing is conducted in a manner that is well known in the art. The map tables 132, 134 may be consulted for this purpose. The identified least cost query or combination of queries is identified at a step 512 and is submitted to the plan enumeration module 154.

At a step 514, the query plan 160 with the least cost is identified, and at a step 516, the optimized query plan 160 is returned by the query optimization module 150, converted to machine code with the code generation module 156, and submitted to the database system 65 for servicing. At a step 517, the optimized query plan 160 is executed on the appropriate table 55, and the query result 68 is returned to the user through the user interface 64. At a step 518 the method 500 ends. The optimized query plan 160 preferably contains instructions native to the host database system or systems 65 to consult a catalog or index within the database system 65 and take the appropriate steps to scan the appropriate tables for the data sought to be retrieved.

Plan Enumeration and Costing

The query optimizer in one embodiment takes the query graph, canonical MapTable, and restructuring-view MapTable as input and produces the best query plan using a dynamic programming model. The plan enumeration algorithm is in one embodiment based on the Starburst cost-based optimizer technology. At each state of the query optimization phase in a Starburst style optimizer, the plan of a smaller subexpression is used to build the query plan for a larger subexpression.

Ordinarily, the query optimizer, during the plan enumeration algorithm, generates the best plan for a subexpression in the query. The best plan of a smaller subexpression is used to build the query plan for a larger subexpression. Ordinarily, the query optimizer during plan enumeration would consider the various plan alternatives such as index scan and table scan for single table access plans and merge join and nested loop join for join plans. The present invention modifies the optimizer to also consider plan alternatives on the restructuring-views, for those subexpressions that had equivalent query alternatives on the restructuring-views. The portion of the plan enumeration algorithm that generates the plan alternatives on the restructuring views is detailed by the Plan Enumeration Operation Algorithm:

Input: A subexpression in the query being planned, the canonical and restructuring-view MapTable.
Output: Best query plan BP with the lowest cost BC
  Generate query plan PBT with cost CBT on the base tables for the input query subexpression
  Initialize best query plan BP=PBT, and best cost BC=CBT
  Determine if the portion of the query planned matches any entry in the canonical MapTable
  If a matching entry is found in the canonical Maptable{
    for each entry in the restructuring views
    MapTable corresponding to the canonical MapTable entry{
      generate query plan PRV with cost CRV for the query on the restructuring view
      If (BC>CRV) then BC=CRV; BP=PRV;
      {
    {
  return BP and BC Plan Enumeration Operation Algorithm When generating a query plan for a query subexpression, the plan enumerator consults canonical MapTable to determine if there are equivalent queries on the canonical schemas. If one or more entries are found, query plans are generated for the entries in the restructuring-views MapTable corresponding to those entries in the canonical MapTable with the same map identifiers. For instance, in our running example query of Example 2, when planning access to the agentTrades table, the plan enumerator will consider four plan alternatives with map identifier 1 in the restructuring-views MapTable, with predicates agent='ag007' and stock='ibm'. The plan enumeration algorithm as before, considers all alternatives, and generates the best query plan based on cost. This enumeration process is entirely cost-based, and the query plan that accesses data from the restructuring-view is chosen only when the cost of the query plan on the restructuring-view has the most optimal cost.

Queries with Aggregation

The operations described in the previous sections, consider only single block SPJ queries and do not consider aggregation. In this section we describe how we handle aggregate queries. For queries that contain aggregates, in addition to constructing the canonical MapTable for the various subexpressions that contain SPJ (select, project, join) queries, we make use of the usability criteria described by Srivastava et. al. (D. Srivastava, S. Dar, S. Jagadish, and A. Levy, Answering Queries with Aggregation Using Views, proceedings of the $22^{nd}$ International Conference on Very Large Data Bases, September. 1996.) to identify equivalent queries on the canonical schemas. We translate the user query on the canonical schema and add an entry into the canonical Map Table. Aggregation queries on the base tables may get transformed into simple SPJ queries on the canonical schema. This becomes important in the next phase.

When generating the restructuring-views Map Table, if the query on the canonical schema does not have aggregation, the CS2RV algorithm converts it to a query on the restructuring view. However, if the query on the canonical schema performs aggregation, and if the restructuring-view under consideration is obtained by performing a schema transformation on one or more of the grouping columns, no alternative query is generated using that restructuring-view. Plan alternatives are generated only for those restructuring-views that can be mapped to the canonical schema without requiring any restructuring operation on any of the grouping columns.

During plan enumeration, the join enumeration phase remains the same as discussed above for plan enumeration and costing. However, we generate additional plan alternatives when generating plans for the group by operation. The canonical MapTable is consulted and if equivalent queries on the restructuring-views exist, new plan alternatives with queries on the restructuring-views is generated. Again the best query plan is then chosen based on cost.

From the above-discussion, it should be readily apparent that the query optimization system and method of the present invention provides the advantages of increased query optimization, especially in multiple data base systems in which tables which are restructuring views are present. In fact, the inventors in a paper, Subramanian, Subbu N., Vankataraman, Shivakumar, Query Optimization Using Restructuring-Views, in Paper# AMERICA 181, November, 1998, document substantial performance gains. The query optimization system is also compatible with and takes advantage of existing technology and may be implemented to be transparent to the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for implementing a database query system, the apparatus comprising:
   a processor for executing instructions; and
   a memory device having thereon modules of executable and operational data for execution by the processor, the modules comprising:
      a schema mapping module executable on a processor to express a schema mapping between a plurality of database schemas, the database schemas containing at least partially replicated information; and
      a middleware module adapted to employ a middleware schema for use as a reference by the schema mapping module in expressing the schema mapping.

2. The apparatus of claim 1, wherein the middleware module comprises a canonical schema module and the middleware schema comprises a canonical schema.

3. The apparatus of claim 1, wherein the middleware module is executable on a processor to devise a virtual middleware table.

4. The apparatus of claim 1, wherein the plurality of database schemas are heterogeneous database schemas.

5. The apparatus of claim 1, further comprising a plurality of operators employable by the schema mapping module in expressing the schema mapping, each operator representing a particular type of manipulation between heterogeneous schemas.

6. The apparatus of claim 5, wherein the plurality of operators are adapted for noninvasive use with existing databases.

7. The apparatus of claim 6, wherein the plurality of operators comprise a fold operator, an unfold operator, a split operator, and a unite operator.

8. The apparatus of claim 1, wherein the schema mapping module comprises an SQL view definition expressing the schema mapping.

9. The apparatus of claim 1, further comprising a schema restructuring module executable on a processor to restructure a database relation into a restructuring view of the database relation in conjunction with the schema mapping module and the middleware module.

10. The apparatus of claim 1, further comprising:
    a query translation module executable on a processor to communicate with the schema mapping module and translate a query executable on one of the plurality of database schemas to equivalent queries on others of the plurality of database schemas; and
    a costing module executable on the processor to select from among the equivalent queries a query corresponding to a selected criterion.

11. A method for implementing a database query system, the method comprising:
    expressing a schema mapping between a plurality of database schemas, the database schemas containing at least partially replicated information; and
    referencing a middleware schema in expressing the schema mapping.

12. The method of claim 11, wherein the middleware schema comprises a canonical schema.

13. The method of claim 11, wherein referencing a middleware schema comprises referencing a virtual middleware table.

14. The method of claim 11, wherein the plurality of database schemas comprise heterogeneous database tables.

15. The method of claim 11, wherein expressing the schema mapping further comprises employing a plurality of operators, each operator representing a particular type of manipulation between heterogeneous schemas.

16. The method of claim 15, wherein the plurality of operators are adapted for noninvasive use with existing databases.

17. The method of claim 16, wherein the plurality of operators include a fold operator, an unfold operator, a split operator, and a unite operator.

18. The method of claim 11, wherein expressing the schema mapping further comprises employing an SQL view definition expressing the schema mapping.

19. The method of claim 11, further comprising restructuring a database relation into a restructuring view of the database relation with the schema mapping.

20. The method of claim 11, further comprising:
    automatically translating a query executable on one of the plurality of database schemas to equivalent queries on others of the plurality of database schemas; and
    automatically selecting from among the equivalent queries a query corresponding to a selected criterion.

21. An article of manufacture comprising a program storage medium readable by a processor and embodying one or more instructions executable by the processor to perform a method for implementing a database query system, the method comprising:
    expressing a schema mapping between a plurality of database schemas, the database schemas containing at least partially replicated information; and
    referencing a middleware schema in expressing the schema mapping.

22. The article of manufacture of claim 21, wherein the middleware schema comprises a canonical schema.

23. The article of manufacture of claim 21, wherein referencing a middleware schema comprises referencing a virtual middleware table.

24. The article of manufacture of claim 21, wherein the plurality of database schemas comprise heterogeneous database tables.

25. The article of manufacture of claim 21, wherein expressing the schema mapping further comprises employing a plurality of operators, each operator representing a particular type of manipulation between different schemas.

26. The article of manufacture of claim 25, wherein the plurality of operators are adapted for noninvasive use with existing databases.

27. The article of manufacture of claim 26, wherein the plurality of operators include an operator selected from the group consisting of a fold operator, an unfold operator, a split operator, and a unite operator.

28. The article of manufacture of claim 21, wherein expressing the schema mapping further comprises employing an SQL view definition expressing the schema mapping.

29. The method of claim 21, wherein the method further comprises restructuring a database relation into a restructuring view of the database relation with the schema mapping.

30. The article of manufacture of claim 21, wherein the method further comprises:
    automatically translating a query executable on one of the plurality of database schemas to equivalent queries on others of the plurality of database schemas; and
    automatically selecting from among the equivalent queries a query corresponding to a selected criterion.

* * * * *

UNITED STATES PATENT AND TRADEMARK OFFICE
CERTIFICATE OF CORRECTION

PATENT NO. : 6,718,320 B1
DATED : April 6, 2004
INVENTOR(S) : Subramanian et al.

It is certified that error appears in the above-identified patent and that said Letters Patent is hereby corrected as shown below:

Drawings,
Figure 3a, Reference No. "186" associated with the term "ibm", should be deleted.
Figure 7, Number "360" should read -- 408 --.

Column 1,
Line 36, "available to over" should read -- available over --.
Line 47, "A View" should read -- A view --.
Line 56, "they maintained" should read -- they are maintained --.

Column 4,
Line 2, "system is one" should read -- system in one --.
Line 5, "in exressing" should read -- in expressing --.

Column 5,
Line 23, "illustrating on" should read -- illustrating one --.
Lines 62 and 66, "through 12," should read -- through 14, --.

Column 6,
Line 49, "form a user or form" should read -- from a user or from --.
Line 60, "devices 28 the" should read -- devices 28, the --.

Column 7,
Line 51, "vice verse." should read -- vice versa. --.
Line 55, "With in the" should read -- Within the --.

Column 8,
Line 2, "of-the present" should read -- of the present --.
Line 20, "vice verse." should read -- vice versa. --.

Column 9,
Line 59, "query. 66" should read -- query 66 --.

Column 10,
Line 13, "relation 184." should read -- relation 176. --.
Line 17, "FIGS." should read -- FIG. --.
Line 18, "name 196, one or more relations 198, relation names 199," should read -- name, one or more relations, relation names, --.
Line 50, "risk-analysis, Q2" should read -- risk-analysis; Q2 --.

UNITED STATES PATENT AND TRADEMARK OFFICE
CERTIFICATE OF CORRECTION

PATENT NO. : 6,718,320 B1
DATED : April 6, 2004
INVENTOR(S) : Subramanian et al.

It is certified that error appears in the above-identified patent and that said Letters Patent is hereby corrected as shown below:

Column 11,
Line 18, "verse." should read -- versa. --.
Line 18, "FIG. 1" should read -- FIG. 3 --.
Line 53, "data within previously" should read -- data previously --.

Column 12,
Line 18, "FIG. 3(i) is" should read -- FIG. 3(a) is --.
Line 20, "FIG. 3(ii)." should read -- FIG. 3(b). --.
Line 63, "agent 008 relations" should read -- 008 agent relations --.
Line 64, "FIG. 3(iii) is" should read -- FIG. 3(c) is --.

Column 13,
Line 51, "FIG. 3(iii)." should read -- FIG. 3(c). --.

Column 14,
TABLE 2, in (V2) ":stock trades R," should read -- :stock_trades R, --.

Column 15,
Line 46, "334, the" should read -- 334, --.

Column 16,
Line 19, "Let coll," should read -- Let col1, --.
Line 59, "step 360," should read -- step 361, --.
Line 62, "table stock trades" should read -- table stock_trades --.

Column 17,
Line 48, "operation 330" should read -- operation 370 --.
Line 57, "god 24 step" should read -- step --.

Column 18,
Line 1, "389" should read -- 390 --.

Column 20,
Line 20, "for the this" should read -- for this --.
Line 49, "FIG. 1," should read -- FIG. 2, --.

Column 21,
Line 12, "the bast" should read -- the base --.
Line 47, "At a s step" should read -- At a step --.

UNITED STATES PATENT AND TRADEMARK OFFICE
CERTIFICATE OF CORRECTION

PATENT NO. : 6,718,320 B1
DATED : April 6, 2004
INVENTOR(S) : Subramanian et al.

It is certified that error appears in the above-identified patent and that said Letters Patent is hereby corrected as shown below:

Column 24,
Lines 36 and 38, "FIG. 10." should read -- FIG. 12. --.

Signed and Sealed this

Twenty-eighth Day of September, 2004

JON W. DUDAS
*Director of the United States Patent and Trademark Office*